(12) United States Patent
Niida

(10) Patent No.: US 9,961,274 B2
(45) Date of Patent: May 1, 2018

(54) IMAGE PICKUP SYSTEM, IMAGE PICKUP APPARATUS, AND METHOD OF CONTROLLING THE SAME

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 14/893,180

(22) PCT Filed: May 29, 2014

(86) PCT No.: PCT/JP2014/002853
§ 371 (c)(1),
(2) Date: Nov. 23, 2015

(87) PCT Pub. No.: WO2014/192302
PCT Pub. Date: Dec. 4, 2014

(65) Prior Publication Data
US 2016/0119549 A1 Apr. 28, 2016

(30) Foreign Application Priority Data

May 31, 2013 (JP) ................................ 2013-115685
May 31, 2013 (JP) ................................ 2013-115687

(51) Int. Cl.
*H04N 5/265* (2006.01)
*G08B 13/196* (2006.01)
(Continued)

(52) U.S. Cl.
CPC ......... *H04N 5/265* (2013.01); *G08B 13/1968* (2013.01); *H04N 5/23206* (2013.01);
(Continued)

(58) Field of Classification Search
CPC ..... H04N 5/265; H04N 7/183; G08B 13/1968
See application file for complete search history.

(56) References Cited

U.S. PATENT DOCUMENTS

2003/0137589 A1 7/2003 Miyata
2004/0085480 A1* 5/2004 Salzer .................... H04N 5/265
348/584

(Continued)

FOREIGN PATENT DOCUMENTS

EP 2426637 A1 3/2012
JP 7-131684 A 5/1995
(Continued)

*Primary Examiner* — Christopher K Peterson
(74) *Attorney, Agent, or Firm* — Canon U.S.A., Inc. IP Division

(57) ABSTRACT

In a method of setting an OSD function according to a related technique, it is not allowed to select various superimposing techniques. In a case where a monitoring camera supports a plurality of superimposing techniques, a user is supposed to select one of the superimposing techniques via a troublesome operation. In view of the above, an image pickup apparatus is provided which includes a reception unit configured to receive an acquisition request for information associated with an image superimposing method of the image pickup apparatus, and a transmission unit configured to, in a case where the acquisition request for the information associated with the image superimposing method of the image pickup apparatus is received by the reception unit, transmit information associated with the image superimposing method of the image pickup apparatus.

18 Claims, 20 Drawing Sheets

(51) Int. Cl.
*H04N 7/18* (2006.01)
*H04N 7/08* (2006.01)
*H04N 5/232* (2006.01)
*H04N 21/485* (2011.01)

(52) U.S. Cl.
CPC ............ *H04N 7/08* (2013.01); *H04N 7/183* (2013.01); *G08B 13/19656* (2013.01); *G08B 13/19667* (2013.01); *G08B 13/19671* (2013.01); *H04N 21/4858* (2013.01)

(56) References Cited

U.S. PATENT DOCUMENTS

| | | |
|---|---|---|
| 2006/0056716 A1 | 3/2006 | Komeno |
| 2008/0180525 A1 | 7/2008 | Kanehira |
| 2010/0214480 A1* | 8/2010 | Kitamori ............... H04N 5/775 348/554 |
| 2013/0286206 A1* | 10/2013 | Ozaki ..................... H04N 7/18 348/148 |

FOREIGN PATENT DOCUMENTS

| | | |
|---|---|---|
| JP | 9-98331 A | 4/1997 |
| JP | 2006211371 A | 8/2006 |
| JP | 2010-161632 A | 7/2010 |
| JP | 2012-109926 A | 6/2012 |
| JP | 2013-031109 A | 2/2013 |
| RU | 2363114 C1 | 7/2009 |
| RU | 2011129788 A | 1/2013 |

* cited by examiner

FIG. 7A

```
<xs:complexType name="OSDConfiguration"/>
    <xs:complexContent>
        <xs:extension base="tt:DeviceEntity/">
            <xs:sequence>
                <xs:element name="OSDReference" type="tt:OSDReference"/>
                <xs:element name="Type" type="tt:OSDType"/>
                <xs:element name="Position" type="tt:OSDPosConfiguration"/>
                <xs:element name="TextString" type="tt:OSDTextConfiguration"
                    minOccurs="0"/>
                <xs:element name="Image" type="tt:OSDImgConfiguration"
                    minOccurs="0"/>
            </xs:sequence>
        </xs:extension>
    </xs:complexContent>
</xs:complexType>
```

FIG. 7B

```
<xs:complexType name="OSDReference"/>
    <xs:choice>
        <xs:element name="VideoSourceConfigurationToken" type="tt:ReferenceToken"/>
        <xs:element name="VideoEncoderConfigurationToken" type="tt:ReferenceToken"/>
        <xs:element name="MediaProfileToken" type="tt:ReferenceToken"/>
        <xs:element name="StreamURI" type="xs:anyURI"/>
        <xs:element name="SnapshotURI" type="xs:anyURI"/>
    </xs:choice>
</xs:complexType>
```

FIG. 7C

```
<xs:simpleType name="OSDType"/>
    <xs:restriction base="xs:string">
        <xs:enumeration value="Text"/>
        <xs:enumeration value="Image" />
    </xs:restriction>
</xs:simpleType>
```

FIG. 7D

```
<xs:complexType name="OSDPosConfiguration"/>
    <xs:sequence>
        <xs:element name="Type" type="xs:string"/>
        <xs:element name="Pos" type="tt:Vector" minOccurs="0"/>
    </xs:sequence>
</xs:complexType>
```

FIG. 7E
```
<xs:complexType name="OSDTextConfiguration"/>
    <xs:sequence>
        <xs:element name="Type" type="tt:OSDTextType" minOccurs="0"/>
        <xs:element name="DateFormat" type="xs:string" minOccurs="0"/>
        <xs:element name="TimeFormat" type="xs:string" minOccurs="0"/>
        <xs:element name="FontSize" type="xs:int" minOccurs="0"/>
        <xs:element name="FontColor" type="tt:Color" minOccurs="0"/>
        <xs:element name="BackGroundColor" type="tt:BackgroundColor"
                    minOccurs="0"/>
        <xs:element name="PlainText" type="xs:string" minOccurs="0"/>
        <xs:element name="Extension" type="tt:OSDTextConfigurationExtension"
                    minOccurs="0"/>
    </xs:sequence>
</xs:complexType>
```

FIG. 7F
```
<xs:complexType name="OSDImageConfiguration"/>
    <xs:sequence>
        <xs:element name="ImgPath" type="xs:anyURI"/>
    </xs:sequence>
</xs:complexType>
```

FIG. 7G
```
<xs:complexType name="Vector"/>
    <xs:attribute name="x" type="xs:float"/>
    <xs:attribute name="y" type="xs:float"/>
</xs:complexType>
```

FIG. 7H
```
<xs:complexType name="Color"/>
    <xs:attribute name="X" type="xs:float" use="required"/>
    <xs:attribute name="Y" type="xs:float" use="required"/>
    <xs:attribute name="Z" type="xs:float" use="required"/>
    <xs:attribute name="Colorspace" type="xs:anyURI"/>
</xs:complexType>
```

FIG. 7I
```
<xs:complexType name="BackgroundColor"/>
    <xs:sequence>
        <xs:element name="Color" type="tt:Color"/>
    </xs:sequence>
    <xs:attribute name="Transparent" type="xs:int" use="optional"/>
</xs:complexType>
```

FIG. 7J
```
<xs:simpleType name="OSDTextType"/>
    <xs:restriction base="xs:string">
        <xs:enumeration value="Plain"/>
        <xs:enumeration value="Date"/>
        <xs:enumeration value="Time"/>
    </xs:restriction>
</xs:complexType>
```

FIG. 8A

```
<xs:complexType name="OSDConfigurationOptions"/>
        <xs:sequence>
                <xs:element name="OSDReferenceOptions" type="tt:OSDReferenceOptions"
                        minOccurs="0"/>
                <xs:element name="MaximumNumberOfOSDs" type="xs:int"/>
                <xs:element name="Type" type="tt:OSDType" maxOccurs="unbounded"/>
                <xs:element name="PositionOption" type="xs:string" maxOccurs="unbounded"/>
                <xs:element name="TextOption" type="tt:OSDTextOptions" minOccurs="0"/>
                <xs:element name="ImageOption" type="tt:OSDImgOptions" minOccurs="0"/>
        </xs:sequence>
</xs:complexType>
```

FIG. 8B

```
<xs:complexType name="OSDReferenceOptions"/>
        <xs:sequence>
                <xs:element name="OSDReference" type="tt:OSDReference" maxOccurs="unbounded"/>
        </xs:sequence>
</xs:complexType>
```

FIG. 8C

```
<xs:complexType name="OSDTextOptions"/>
        <xs:sequence>
                <xs:element name="Type" type="tt:OSDTextType" maxOccurs="unbounded"/>
                <xs:element name="FontSizeRange" type="tt:IntRange"/>
                <xs:element name="DateFormat" type="xs:string" minOccurs="0" maxOccurs="unbounded"/>
                <xs:element name="TimeFormat" type="xs:string" minOccurs="0" maxOccurs="unbounded"/>
                <xs:element name="Color" type="tt:ColorOptions" minOccurs="0"/>
                <xs:element name="Transparent" type="tt:IntRange" minOccurs="0"/>
        </xs:sequence>
</xs:complexType>
```

FIG. 8D

```
<xs:complexType name="OSDImgOptions"/>
        <xs:sequence>
                <xs:element name="ImagePath" type="xs:anyURI" maxOccurs="unbounded"/>
        </xs:sequence>
</xs:complexType>
```

FIG. 8E

```
<xs:complexType name="IntRange"/>
    <xs:sequence>
        <xs:element name="Min" type="xs:int"/>
        <xs:element name="Max" type="xs:int"/>
    </xs:sequence>
</xs:complexType>
```

FIG. 8F

```
<xs:complexType name="ColorOptions">
    <xs:sequence>
        <xs:choice>
            <xs:element name="ColorList" type="tt:Color" maxOccurs="unbounded"/>
            <xs:element name="ColorspaceRange" type="tt:ColorspaceRange"
                    maxOccurs="unbounded"/>
        </xs:choice>
    </xs:sequence>
</xs:complexType>
```

FIG. 8G

```
<xs:complexType name="ColorspaceRange">
    <xs:sequence>
        <xs:element name="X" type="tt:FloatRange"/>
        <xs:element name="Y" type="tt:FloatRange"/>
        <xs:element name="Z" type="tt:FloatRange"/>
        <xs:element name="Colorspace" type="xs:anyURI"/>
    </xs:sequence>
</xs:complexType>
```

FIG. 8H

```
<xs:complexType name="FloatRange"/>
    <xs:sequence>
        <xs:element name="Min" type="xs:float"/>
        <xs:element name="Max" type="xs:float"/>
    </xs:sequence>
</xs:complexType>
```

FIG. 9A

```
<xs:element name="GetOSDConfigurationOptions">
    <xs:complexType>
      <xs:sequence>
        <xs:element name="OSDReference" type="tt:OSDReference" minOccurre="0"/>
      </xs:sequence>
    </xs:complexType>
</xs:element>
```

FIG. 9B

```
<xs:element name="GetOSDConfigurationOptionsResponse">
    <xs:complexType>
      <xs:sequence>
        <xs:element name="OSDConfigurationOptions" type="tt:OSDConfigurationOptions" />
      </xs:sequence>
    </xs:complexType>
</xs:element>
```

FIG. 9C

```
<?xml version="1.0" encoding="UTF-8" ?>
 <SOAP-ENV:Envelope
    ......
    xmlns:trt="http://www.onvif.org/ver10/media/wsdl">
 <SOAP-ENV:Header>
    ......
 </SOAP-ENV:Header>
 <SOAP-ENV:Body>
   <trt:GetOSDConfigurationOptions>
     </trt:GetOSDConfigurationOptions>
 </SOAP-ENV:Body>
</SOAP-ENV:Envelope>
```

FIG. 9D

```xml
<?xml version="1.0" encoding="UTF-8" ?>
<SOAP-ENV:Envelope
......
  xmlns:trt="http://www.onvif.org/ver10/media/wsdl">
<SOAP-ENV:Header>
......
</SOAP-ENV:Header>
<SOAP-ENV:Body>
  <trt:GetOSDConfigurationOptionsResponse>
    <tt:OSDConfigurationOptions>
      <tt:OSDReferenceOptions>
        <tt:OSDReference><tt:VideoSourceConfigurationToken>VSC0</tt:VideoSourceConfigurationToken></tt:OSDReference>
        <tt:OSDReference><tt:VideoEncoderConfigurationToken>MJPEG0</tt:VideoEncoderConfigurationToken></tt:OSDReference>
        <tt:OSDReference><tt:VideoEncoderConfigurationToken>MJPEG1</tt:VideoEncoderConfigurationToken></tt:OSDReference>
        <tt:OSDReference><tt:VideoEncoderConfigurationToken>H264_0</tt:VideoEncoderConfigurationToken></tt:OSDReference>
        <tt:OSDReference><tt:VideoEncoderConfigurationToken>H264_1</tt:VideoEncoderConfigurationToken></tt:OSDReference>
        <tt:OSDReference><tt:VideoEncoderConfigurationToken>MPEG4_0</tt:VideoEncoderConfigurationToken></tt:OSDReference>
        <tt:OSDReference><tt:StreamURI>rtsp://192.168.100.1/OSDstream/</tt:StreamURI></tt:OSDReference>
      </tt:OSDReferenceOptions>
      <tt:MaximumNumberOfOSDs>5</tt:MaximumNumberOfOSDs>
      <tt:Type>Text</tt:Type>
      <tt:Type>Image</tt:Type>
      <tt:PositionOption>UpperLeft</tt:PositionOption><tt:PositionOption>UpperRight</tt:PositionOption>
      <tt:PositionOption>LowerLeft</tt:PositionOption><tt:PositionOption>LowerRight</tt:PositionOption>
      <tt:PositionOption>Custom</tt:PositionOption>
      <tt:TextOption>
        <tt:Type>Plain</tt:Type><tt:Type>Date</tt:Type><tt:Type>Time</tt:Type>
        <tt:FontSizeRange><tt:Min>10</tt:Min><tt:Max>26</tt:Max></tt:FontSizeRange>
        <tt:DateFormat>dd MMMM, yyyy</tt:DateFormat>
        <tt:TimeFormat>H:mm:ss</tt:TimeFormat>
        <tt:Color>
          <tt:ColorspaceRange>
            <tt:X><tt:Min>0</tt:Min><tt:Max>255</tt:Max></tt:X>
            <tt:Y><tt:Min>0</tt:Min><tt:Max>255</tt:Max></tt:Y>
            <tt:Z><tt:Min>0</tt:Min><tt:Max>255</tt:Max></tt:Z>
            <tt:Colorspace>http://www.onvif.org/Colorspace/RGB</tt:Colorspace>
        </tt:Color>
        <tt:Transparent><xs:Min>0</xs:Min><xs:Max>2</xs:Max></tt:Transparent>
      </ttTextOption>
      <tt:ImageOption>
        <tt:ImagePath>http://192.168.100.1/OSDimages/sample01.jpg</tt:ImagePath>
      </tt:ImageOption>
    </tt:OSDConfigurationOptions>
  </trt:GetOSDConfigurationOptionsResponse>
</SOAP-ENV:Body>
</SOAP-ENV:Envelope>
```

FIG. 12A

```
<xs:element name="SetOSD">
    <xs:complexType>
        <xs:sequence>
            <xs:element name="OSD" type="tt:OSDConfiguration"/>
        </xs:sequence>
    </xs:complexType>
</xs:element>
```

FIG. 12B

```
<?xml version="1.0" encoding="UTF-8" ?>
 <SOAP-ENV:Envelope
    ......
    xmlns:trt="http://www.onvif.org/ver10/media/wsdl">
 <SOAP-ENV:Header>
    ......
 </SOAP-ENV:Header>
 <SOAP-ENV:Body>
   <trt:SetOSD>
     <tt:OSDConfiguration>
       <tt:OSDReference>
         <tt:VideoEncoderConfigurationToken>H264_0</tt:VideoEncoderConfigurationToken>
       </tt:OSDReference>
       <tt:Type>Text</tt:Type>
       ......
     </tt:OSDConfiguration>
   </trt:SetOSD>
 </SOAP-ENV:Body>
</SOAP-ENV:Envelope>
```

IMAGE PICKUP SYSTEM, IMAGE PICKUP APPARATUS, AND METHOD OF CONTROLLING THE SAME

TECHNICAL FIELD

The present invention relates to an image pickup apparatus capable of transmitting a picked-up image to the outside, and more particularly, to a technique of superimposing information such as an image or the like on a picked-up image.

BACKGROUND ART

In related techniques, it is known to superimpose a character, an image, or the like, on another image at a particular position and transmit a resultant image signal. An example of such a technique is known as an on screen display function (hereinafter, referred to as an OSD function) to display information such as a character, an image, or the like, on another image at a fixed position.

It is also known to dynamically change the position at which information such as a character, an image, or the like, is superimposed. For example, PTL 1 discloses an image pickup apparatus configured such that when a housing of a camera is panned or tilted, the position of a cursor on a display screen is moved in response to the movement of the housing.

In the OSD function in the related technique, various superimposing methods are known. One method is to specify an encoder in performing superimposing for an image source. Another method is to allow a user to specify a received stream to be subjected to superimposing.

For example, in the case where superimposing is performed on an image source, the OSD function is applied such that superimposing is performed on all images transmitted from an image pickup apparatus. On the other hand, in the case where superimposing is performed on a stream to be transmitted, only a user who receives the stream is allowed to view the superimposed information such as a character or an image.

In a situation in which a plurality of superimposing methods are supported, there is a need for a technique to select one of the superimposing methods depending on a user or an application.

However, in setting OSD functions according to related techniques, it is not allowed select a superimposing method from a plurality of methods.

Among the plurality of superimposing methods, in the method of specifying an encoder used in the superimposing, a difference may occur in terms of a scope of information to be subjected to superimposing depending on whether the information is superimposed on a picked-up image before the picked-up image is encoded, or after the picked-up image is encoded.

That is, in the case where a character, an image, or the like is superimposed on a picked-up image before the picked-up image is encoded, it is easy to display the same character, image, or the like, on all picked-up images to be subjected to the same encoding. On the other hand, in the case where a character, an image, or the like, is superimposed on a picked-up image after the picked-up image is encoded, the character, the image, or the like, is displayed only on the picked-up image applied with particular setting.

In most cases, the setting of the encoding method includes setting of an image size or an image resolution. That is, when the encoding method is set, the image size of an image to be encoded is set, and enlarging or reducing of a picked-up image is performed before the encoding process. The process of enlarging/reducing the picked-up image includes sampling the image, interpolation, and the like.

In the case where an encoder is specified in the superimposing, there is a possibility that a difference may occur in terms of a range of information such as a character or an image to be subjected to superimposing depending on whether the superimposing is performed before or after the process of enlarging/reducing the picked-up image is performed.

As described above, in the superimposing method in which the encoder is specified, the scope subjected to the superimposing may vary. A user may be allowed to set all items such that such a difference does not occur. However, in this case, the user has to perform a troublesome operation, which results in a reduction in convenience for users.

CITATION LIST

Patent Literature

PTL 1: Japanese Patent Laid-Open No. 7-131684

SUMMARY OF INVENTION

In view of the above, the invention provides an image pickup apparatus including a reception unit configured to receive an acquisition request for information associated with an image superimposing method of the image pickup apparatus, and a transmission unit configured to transmit information associated with the image superimposing method of the image pickup apparatus in a case where the acquisition request for the information associated with the image superimposing method of the image pickup apparatus is received by the reception unit.

Further features of the present invention will become apparent from the following description of exemplary embodiments with reference to the attached drawings.

BRIEF DESCRIPTION OF DRAWINGS

FIG. 7A illustrates an example of a definition of an OSDConfiguration type according to an embodiment.

FIG. 7B illustrates an example of a definition of an OSDReference type according to an embodiment.

FIG. 7C illustrates an example of a definition of the OSDType type according to an embodiment.

FIG. 7D illustrates an example of a definition of an OSDPosConfiguration type according to an embodiment.

FIG. 7E illustrates an example of a definition of an OSDTextConfiguration type according to an embodiment.

FIG. 7F illustrates an example of a definition of an OSDImageConfiguration type according to an embodiment.

FIG. 7G illustrates an example of a definition of a Vector type according to an embodiment.

FIG. 7H illustrates an example of a definition of a Color type according to an embodiment.

FIG. 7I illustrates an example of a definition of a BackgroundColor type according to an embodiment.

FIG. 7J illustrates an example of a definition of OSDTextType according to an embodiment.

FIG. 8A illustrates an example of a definition of an OSDConfigurationOptions type according to an embodiment.

FIG. 8B illustrates an example of a definition of the OSDReferenceOptions type according to an embodiment.

FIG. 8C illustrates an example of a definition of an OSDTextOptions type according to an embodiment.

FIG. 8D illustrates an example of a definition of an OSDImageOptions type according to an embodiment according to an embodiment.

FIG. 8E illustrates an example of a definition of an IntRange type according to an embodiment according to an embodiment.

FIG. 8F illustrates an example of a definition of a ColorOptions type according to an embodiment according to an embodiment.

FIG. 8G illustrates an example of a definition of a ColospaceRange type according to an embodiment according to an embodiment.

FIG. 8H illustrates an example of a definition of a FloatRange type according to an embodiment according to an embodiment.

FIG. 9A illustrates an example of a definition of a GetOSDConfigurationOptions command type according to an embodiment.

FIG. 9B illustrates an example of a definition of GetOSDConfigurationOptionsResponse according to an embodiment.

FIG. 9C illustrates an example of a configuration of a GetOSDConfigurationOptions command according to an embodiment.

FIG. 9D illustrates an example of a configuration of a GetOSDConfigurationOptions command according to an embodiment.

FIG. 12A illustrates an example of a definition of a SetOSD command according to an embodiment.

FIG. 12B illustrates a specific example of a configuration of a SetOSD command.

DESCRIPTION OF EMBODIMENTS

Figure 1:
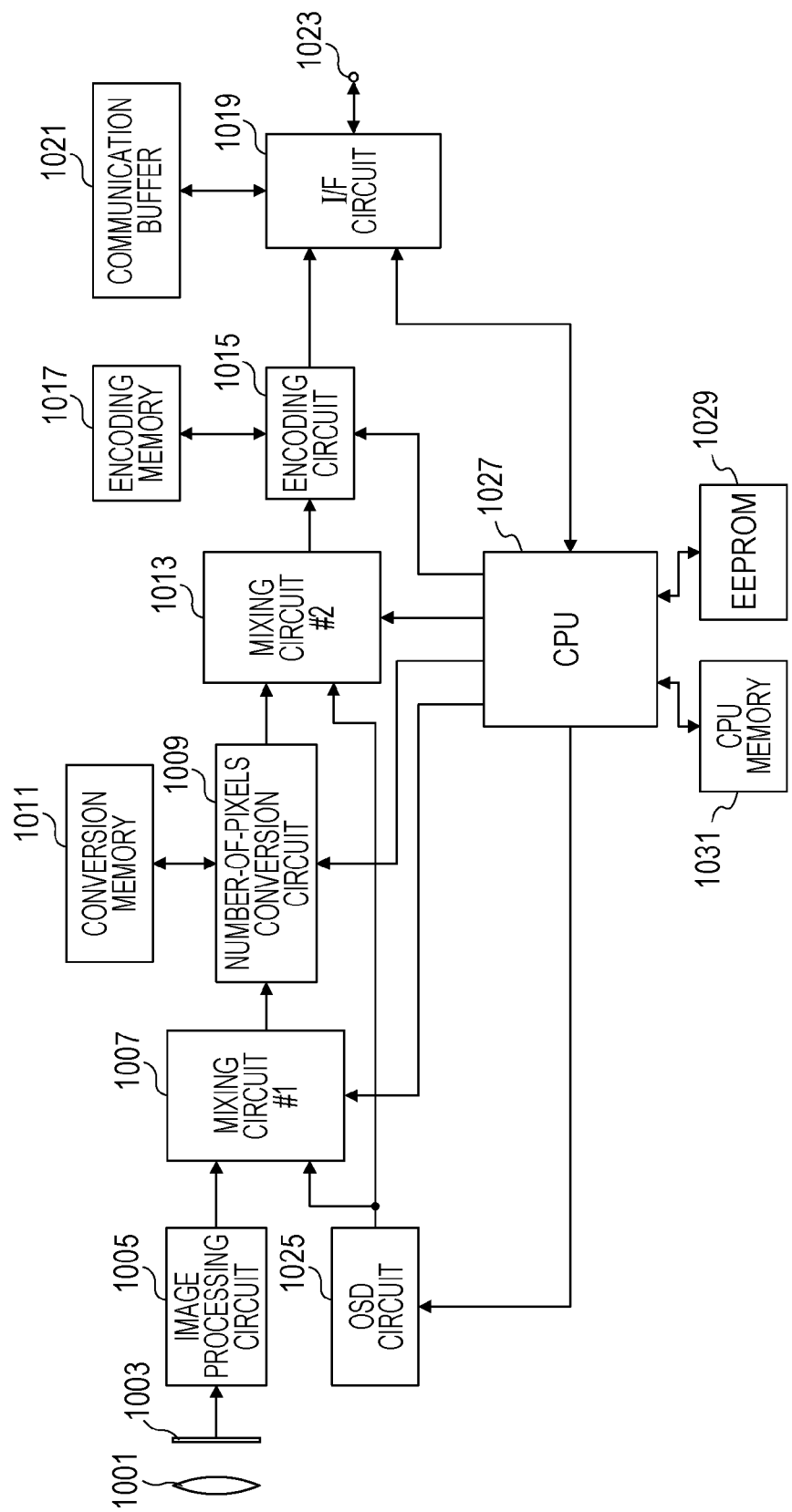
FIG. 1 is a block diagram illustrating a configuration of a monitoring camera according to an embodiment.

FIG. 1 is a block diagram illustrating a configuration of a monitoring camera according to an embodiment.

As illustrated in FIG. 1, the monitoring camera includes an imaging optical system 1001, an image sensor 1003, an image processing circuit 1005, a first mixing circuit 1007, a number-of-pixels conversion circuit 1009, and a number-of-pixels conversion memory 1011. The monitoring camera further includes a second mixing circuit 1013, an encoding circuit (compression encoding processing circuit) 1015, an encoding memory 1017, a communication circuit (hereinafter referred to as an IF circuit) 1019, a communication buffer 1021, and a communication port 1023. The monitoring camera further includes an OSD circuit 1025, a central processing unit (hereinafter, referred to as a CPU) 1027, an electrically writable/erasable nonvolatile memory (hereinafter, referred to as an EEPROM) 1029, and a CPU memory 1031.

Referring to FIG. 1, an operation of the monitoring camera according to the present embodiment is described below.

A light ray from an object to be picked up is incident on the image sensor 1003 via the imaging optical system 1001 and is converted into an electric signal. In the present embodiment, the image sensor 1003 may be realized using a CCD, a CMOS, or the like. The image sensor 1003 in the present embodiment functions as an image sensing unit that senses an image of an object formed via the imaging optical system 1001 and outputs a resultant image signal.

In FIG. 1, the OF circuit 1019 receives an OSD setting command from a client apparatus that will be described later. The OSD setting command is analyzed by the CPU 1027 and OSD setting information is input to the OSD circuit 1025. The OSD circuit 1025 generates an OSD according to the input OSD setting information.

The I/F circuit 1019 also outputs an image stream, encoded by the encoding circuit 1015 in a manner specified by a user, to the outside. The setting information in terms of the encoding is transmitted from the client apparatus described below and is received by the OF circuit 1019. Based on the encoding setting information, the CPU 1027 instructs the encoding circuit 1015 in terms of the encoding. For example, encoding methods employable in the present embodiment include Motion JPEG (hereinafter referred to as MJPEG), H.264, MPEG4, MPEG2, H.265 and the like.

The encoding setting information includes specifying information in terms of the image size or the image resolution. In a case where the image output from the image sensor 1003 has an image size different from the specified image size, the number-of-pixels conversion circuit 1009 performs an image enlargement or reduction process to generate an image with the specified image size. The image enlargement or reduction process may include an image interpolation process.

In the monitoring camera according to the present embodiment, by performing the operation in the above-described manner, it is possible to transmit, at substantially the same time, a plurality of image streams with different image sizes for the same scene encoded in the same encoding method. That is, images with different image sizes for the same scene generated by the number-of-pixels conversion circuit 1009 are input in a time multiplexed manner to the encoding circuit 1015, and the images are subjected to the encoding in the same encoding method and output. The resultant image streams are output to the outside via the I/F circuit 1019.

Next, referring to FIG. 2, a configuration of the client apparatus according to the present embodiment is described below.

Figure 2:
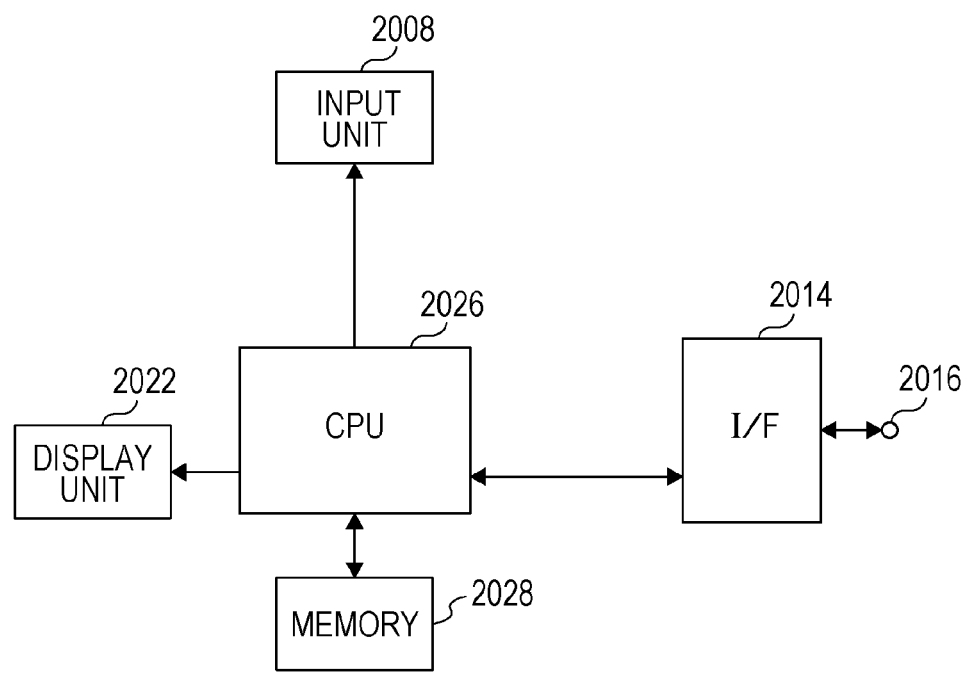
FIG. 2 is a block diagram illustrating a configuration of a client apparatus according to an embodiment.

FIG. 2 is a block diagram illustrating the configuration of the client apparatus according to the present embodiment.

As illustrated in FIG. 2, the client apparatus includes an input unit 2008, a digital interface unit (hereinafter referred to as an I/F) 2014, an interface terminal 2016, a display unit 2022, a central processing unit (hereinafter, referred to as a CPU) 2026, and a memory 2028.

The client apparatus illustrated in FIG. 2 may typically be a general-purpose computer such as a personal computer (hereinafter referred to as a PC). The input unit 2008 may be, for example, a keyboard, a pointing device such as a mouse, or the like. The display unit 2022 may be, for example, a liquid crystal display apparatus, a plasma display apparatus, a cathode ray tube (CRT) such as a Braun tube, or the like.

A graphical user interface (GUI) of the client apparatus is displayed on the display unit 2022. A user of the client apparatus is allowed to operate the GUI via the input unit 2008. The CPU 2026 executes software to display the GUI and detect a user operation on the input unit 2008. An intermediate result during a calculation or an operation performed by the CPU 2026, a data value that will be referred to later, and the like are temporarily stored in the memory 2028 and they will be used later. In the present embodiment, by performing the operation in the above-described manner, the operation of the external client apparatus described above is realized.

Next, referring to FIGS. 3A to 3C, a configuration of a network according to the present embodiment is described below.

Figure 3A:
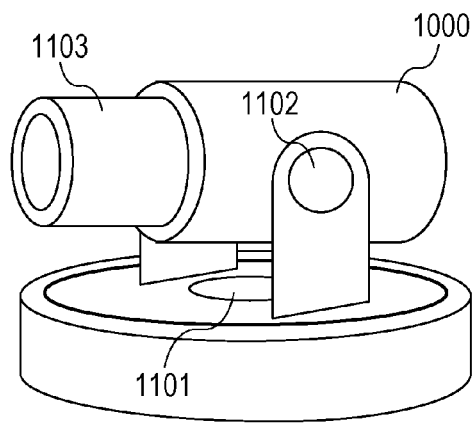
FIG. 3A is a diagram illustrating a monitoring camera according to an embodiment.

In FIG. 3A, reference numeral 1000 denotes a monitoring camera according to an embodiment.

Reference numeral 1101 denotes a mechanism that allows it to pan the direction of a lens. Reference numeral 1102 denotes a mechanism that allows it to tilt the direction of the lens. Reference numeral 1103 denotes a zoom mechanism.

Figure 3B:
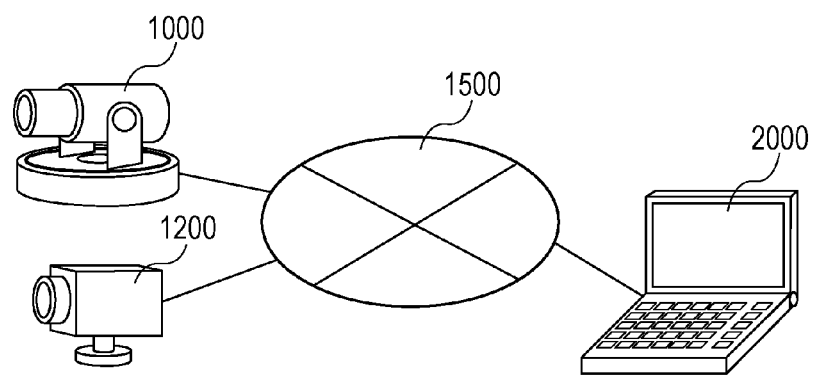
FIG. 3B is a diagram illustrating a system including a monitoring camera and a client apparatus according to an embodiment.

FIG. 3B is a diagram illustrating a configuration of a system including the monitoring camera 1000.

Reference numeral 2000 denotes a client apparatus that is an external apparatus according to the present embodiment. The monitoring camera 1000 and the client apparatus 2000 are connected to each other via an IP network 1500 such that they are allowed to communicate to each other. The client apparatus 2000 transmits various commands to the monitoring camera 1000 in terms of changing an image picking-up parameter, driving a camera platform, starting an image stream, and the like which will be described later. The monitoring camera 1000 transmits a response to a received command or an image stream to the client apparatus 2000.

Figure 3C:
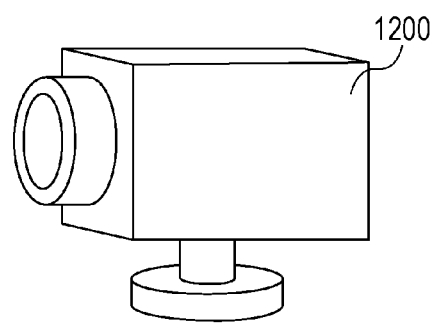
FIG. 3C is a diagram illustrating another example of a monitoring camera according to an embodiment.

FIG. 3C is a diagram illustrating another example of a monitoring camera according to the present embodiment.

In FIG. 3C, reference numeral 1200 denotes the monitoring camera according to the embodiment. The monitoring camera 1200 is connected to the client apparatus 2000 via the IP network 1500 such that they are allowed to communicate with each other. The client apparatus 2000 transmits various commands to the monitoring camera 1200 in terms of changing an image picking-up parameter, starting an image stream, and the like which will be described later. The monitoring camera 1200 transmits a response to a received command or an image stream to the client apparatus 2000.

Figure 4A:
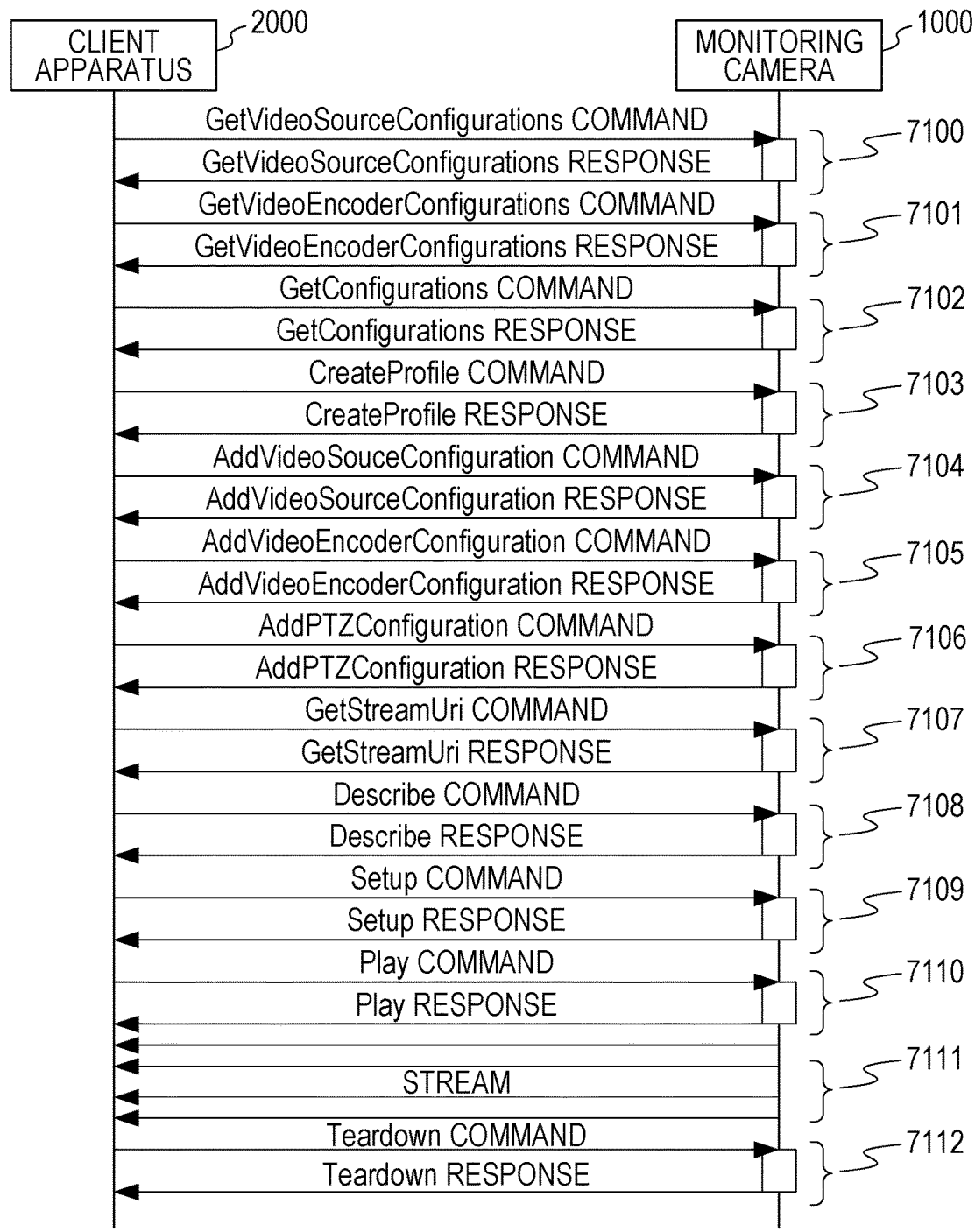
FIG. 4A is a sequence chart illustrating a command transaction according to an embodiment.
Figure 4B:
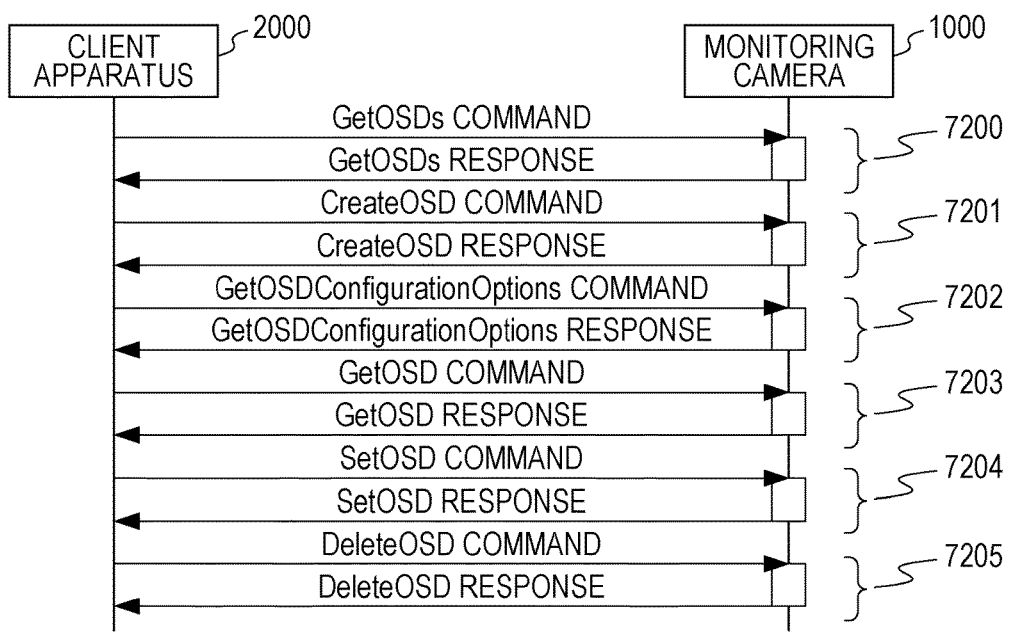
FIG. 4B is a sequence chart illustrating a command transaction according to an embodiment.

Next, referring to FIGS. 4A and 4B, a command transaction according to the present embodiment is described.

FIGS. 4A and 4B are sequence charts of a command transaction between the monitoring camera 1000 and the client apparatus 2000.

FIG. 4A illustrates a typical command transaction from starting of setting to transmitting of an image.

In FIG. 4A, reference numeral 7100 denotes a transaction of a GetVideoSourceConfigurations command. By this command, the client apparatus 2000 acquires a VideoSourceConfiguration list stored in the monitoring camera 1000.

Reference numeral 7101 denotes a transaction of a GetVideoEncoderConfigurations command. By this command, the client apparatus 2000 acquires a VideoEncoderConfiguration list stored in the monitoring camera 1000.

Reference numeral 7102 denotes a transaction of a GetConfigurations command. By this command, the client apparatus 2000 acquires a PTZConfiguration list stored in the monitoring camera 1000.

Reference numeral 7103 denotes a transaction of a CreateProfile command. By this command, the client apparatus 2000 creates new MediaProfile in the monitoring camera 1000 and acquires its ProfileToken.

Reference numerals 7104, 7105, and 7106 respectively denote transactions of an AddVideoSourceConfiguration command, an AddVideoEncoderConfiguration command, and an AddPTZConfiguration command.

By these commands, the client apparatus 2000 is allowed to relate particular VideoSourceConfiguration, VideoEncoderConfiguration, and PTZConfiguration to specified MediaProfile.

Reference numeral 7107 denotes a transaction of a GetStreamUri command. By this command, the client apparatus 2000 acquires an address (URI) at which a stream is transmitted from the monitoring camera 1000.

Reference numeral 7108 denotes a transaction of a Describe command. By executing this command using the URI acquired in 7107, the client apparatus 2000 requests information about a content distributed in the form of a stream from the monitoring camera 1000, and acquires the information.

Reference numeral 7109 denotes a transaction of a Setup command. By executing this command using the URI acquired in 7107, the client apparatus 2000 and the monitoring camera 1000 shares a stream transmission method including a session number.

Reference numeral 7110 denotes a transaction of a Play command. By executing this command using the session number acquired in 7109, the client apparatus 2000 requests the monitoring camera 1000 to start a stream.

Reference numeral 7111 denotes a transmitted stream. The monitoring camera 1000 transmits a stream requested to be started in 7110 in the transmission method shared in 7109.

Reference numeral 7112 denotes a transaction of a Teardown command. By executing this command using the session number acquired in 7109, the client apparatus 2000 requests the monitoring camera 1000 to stop a stream.

Next, referring to FIG. 4B, a command transaction in terms of OSD setting according to the present embodiment is described.

FIG. 4B is a sequence chart illustrating a typical command transaction in terms of OSD setting (transaction to request acquisition) between the monitoring camera 1000 and the client apparatus 2000.

In FIG. 4B, reference numeral 7200 denotes a transaction of a GetOSDs command. The GetOSDs command is a command used by the client apparatus 2000 to instruct the monitoring camera 1000 to return all OSDConfiguration 6105 related to specified OSDReference.

Reference numeral 7201 denotes a transaction of a CreateOSD command. The CreateOSD command is a command used by the client apparatus 2000 to instruct the monitoring camera 1000 to newly create OSDConfiguration 6105 so as to be related to specified OSDReference. By executing the CreateOSD command, the monitoring camera 1000 returns OSDToken, which is an ID of a generated OSD, to the client apparatus 2000.

Reference numeral 7202 denotes a transaction of a GetOSDConfigurationOptions command.

The GetOSDConfigurationOptions command is a command used by the client apparatus 2000 to instruct the monitoring camera 1000 to return a selection range or options of each parameter of the OSDConfiguration. The selection range or the options of each parameter of the OSDConfiguration may be set using a SetOSD command that will be described below.

In the present embodiment, the client apparatus receives a GetOSDConfigurationOptions response as a response to the GetOSDConfigurationOptions command.

The transmission of the GetOSDConfigurationOptions command is an operation of inquiring a capability of the image processing apparatus in terms of supporting a plurality of superimposing methods. The process performed by the client apparatus according to the present embodiment to receive the GetOSDConfigurationOptions response is a process of receiving a response as to the capability of supporting superimposing methods.

Reference numeral 7203 denotes a transaction of a GetOSD command. The GetOSD command is a command used by the client apparatus 2000 to instruct the monitoring camera 1000 to return OSDConfiguration having specified OSDToken.

Reference numeral 7204 denotes a transaction of a SetOSD command. The SetOSD command is a command used by the client apparatus 2000 to instruct the monitoring camera 1000 to edit each parameter included in the OSDConfiguration. By executing the CreateOSD command, the monitoring camera 1000 edits the content of the OSDConfiguration having the OSDToken specified by the client apparatus 2000. By performing this operation, the client apparatus 2000 is capable of instructing the monitoring camera 1000 to display a new OSD or change the color, the size, the position, and/or the like of the OSD being displayed.

The operation of transmitting the SetOSD command is an operation of transmitting OSD information.

Reference numeral 7205 denotes a transaction of DeleteOSD command. The DeleteOSD command is a command used by the client apparatus 2000 to instruct the monitoring camera 1000 to delete OSDConfiguration created in response to the CreateOSD command. By executing the DeleteOSD command, the monitoring camera 1000 deletes the OSDConfiguration having the OSDToken specified by the client apparatus 2000 from the storage unit of the monitoring camera 1000.

Next, referring to FIGS. 5A to 5D, an OSD setting graphical user interface (hereinafter also referred to as a GUI) of the client apparatus according to the present embodiment is described.

FIGS. 5A to 5D are diagrams illustrating examples of the GUI.

Figure 5A:
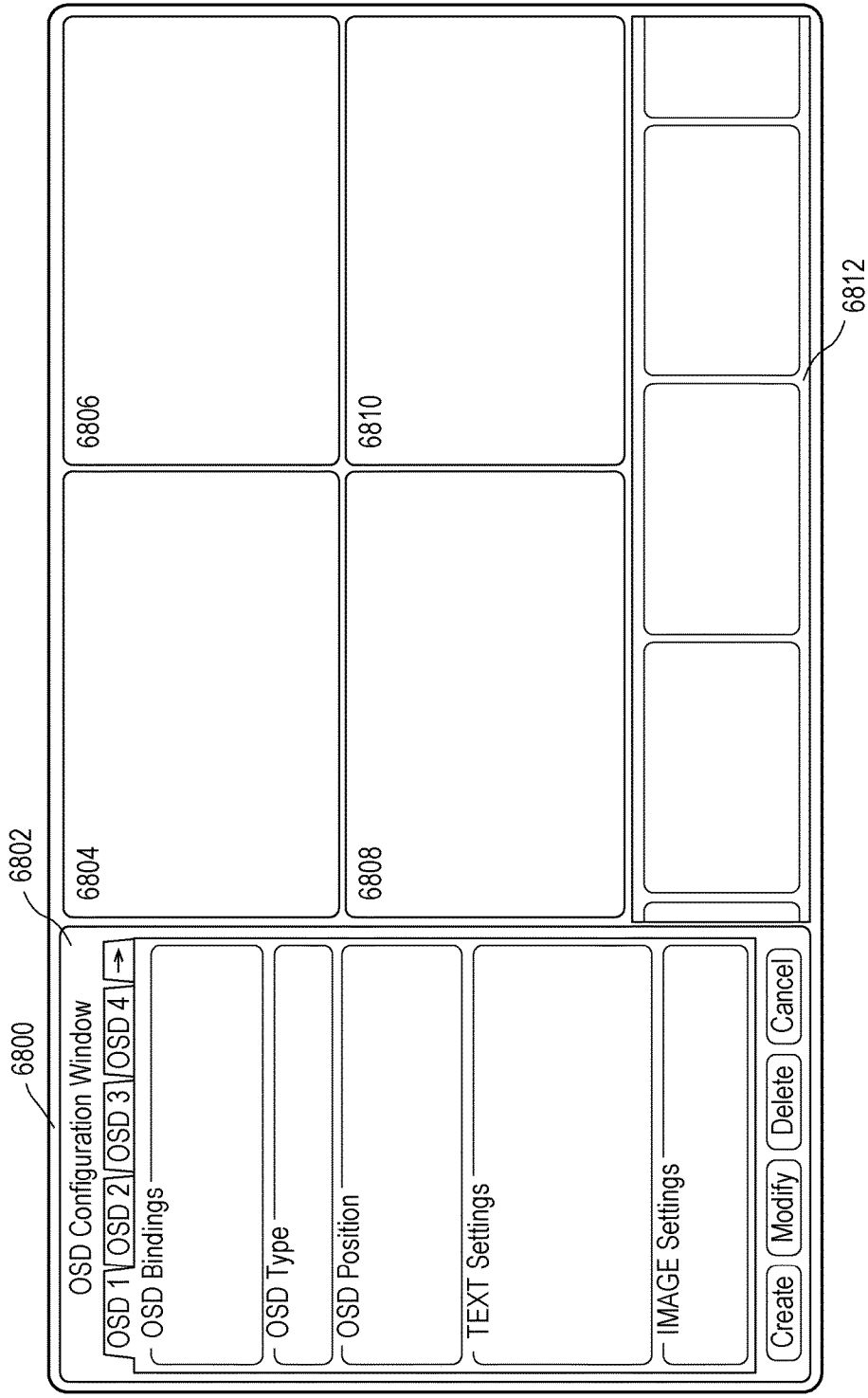
FIG. 5A is a diagram illustrating a graphical user interface (GUI) for setting an on-screen display (OSD) of a client apparatus according to an embodiment.

In FIG. 5A, reference numeral 6800 denotes a client application window, and reference numeral 6802 denotes an OSD setting window (a window for setting an image superimposing method). Reference numerals 6804, 6806, 6808, and 6810 respective denote a first stream display window, a second stream display window, a third stream display window, and a fourth stream display window. Reference numeral 6812 denotes a stream selection window.

In the client apparatus according to the present embodiment, a user is allowed to set each item in the OSD setting window 6802 thereby setting the monitoring camera connected to the client apparatus in terms of the displaying of the OSD.

In the first stream display window 6804 to the fourth stream display window 6810, stream images selected by the client apparatus according to the present embodiment are displayed. The stream selection window 6812 is capable of displaying all stream images receivable by the client apparatus according to the present embodiment. In this stream selection window 6812, images are displayed in a reduced form.

In the client apparatus according to the present embodiment, in selecting a desired stream image, a user is allowed to scroll reduced image display windows in the stream selection window 6812 in a right or left direction. A selected stream image is allowed to be displayed in an enlarged manner in one of the first stream display window 6804 to the fourth stream display window 6810.

In the OSD setting GUI, after one of the first stream display window 6804 to the fourth stream display window 6810 is selected, if the OSD setting window 6802 is selected, a user is allowed to perform OSD setting for the selected image.

Figure 5B:
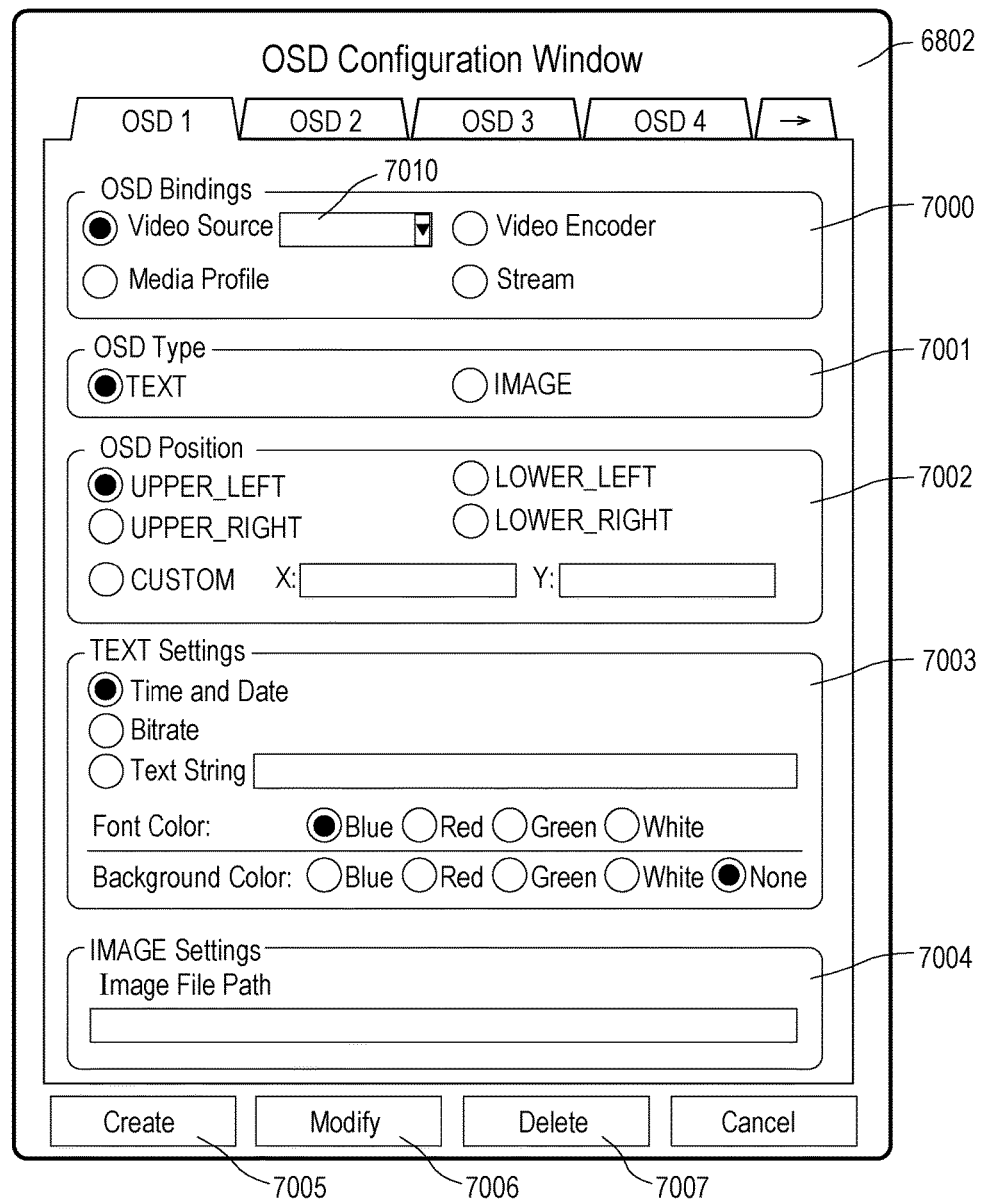
FIG. 5B is a diagram illustrating a graphical user interface (GUI) for setting an on-screen display (OSD) of a client apparatus according to an embodiment.

Referring to FIG. 5B, functions of the OSD setting window 6802 are described below.

In FIG. 5B, reference numeral 7000 denotes an OSD setting target selection frame, reference numeral 7001 denotes an OSD type setting frame, and reference numeral 7002 denotes an OSD display position setting frame. Reference numeral 7003 denotes a text setting frame, and reference numeral 7004 denotes an image setting frame. Reference numeral 7005 denotes an OSD create button, reference numeral 7006 denotes an OSD modify button, reference numeral 7007 denotes an OSD delete button, and reference numeral 7010 denotes a reference selection box.

The OSD setting target selection frame 7000 is a frame for selecting an OSD setting target category on the monitoring camera. In the present embodiment, the OSD setting target categories include, for example, a video source configuration, a video encoder configuration, a media profile, a stream URI, and a snapshot URI.

The video source configuration is a configuration of a video source that functions as an image source. The video encoder configuration is a configuration of a video encoder that functions as an encoder.

The media profile includes, in concept, information about a combination of an image source and an encoder, additional associated information such as an audio stream, a meta data stream, and the like, information about a combination of a plurality of pieces of information such as a direction in which an image is picked up. The media profile functions as information for identifying a stream.

Note that the stream URI and the snapshot URI also operate as stream identification information. More specifically, the stream URI is information identifying a stream of a moving image, while the snapshot URI is information identifying a stream of a still image. By using the stream URI and the snapshot URI, it is allowed to control OSD setting individually for respective users having different user authorities. In the present embodiment, setting of OSD is allowed only for an image stream to which administrator authority is applied, and thus the OSD is allowed to be viewed only on the client apparatus operating under the administrator authority. In the present embodiment, by performing the operation in the above-described manner, it is possible to perform the OSD setting such that information such as debug information that is necessary only for a particular user having a particular user authority is not disclosed to a user who does not need such information.

In the present embodiment, before the client apparatus displays the OSD setting window 6802, the client apparatus transmits, for example, the GetOSDConfigurationOptions command to the monitoring camera. In response to this command, the monitoring camera returns, to the client apparatus, GetOSDConfigurationOptionsResponse to notify of a range in which each parameter is allowed to be set or a list of selectable values associated with OSDConfiguration.

Although it is assumed in the present embodiment that the GetOSDConfigurationOptions command is transmitted before the OSD setting window 6802 is displayed, the transmission timing thereof is not limited to that. Alternatively, for example, the GetOSDConfigurationOptions command may be transmitted when the GUI of the client apparatus according to the present embodiment is displayed. Still alternatively, the GetOSDConfigurationOptions command may be transmitted when the client apparatus according to the present embodiment is started.

Still alternatively, the GetOSDConfigurationOptions command may be transmitted when a user selects a stream from windows of the first stream display window 6804 to the fourth stream display window 6810.

Still alternatively, the GetOSDConfigurationOptions command may be transmitted when a stream is selected from stream images displayed in the reduced manner in the stream selection window 6812.

In this case, newest OSD information associated with the selected stream is obtained, which may be advantageous.

The GetOSDConfigurationOptionsResponse described above includes a list of references for which the OSD setting is allowed in the monitoring camera according to the present embodiment The list of references is data of the OSDReferenceOptions type. Note that the data of the OSDReferenceOptions includes information associated with the OSD setting target category.

The operation of transmitting the GetOSDConfigurationOptions command is an operation of inquiring a capability of supporting a plurality of superimposing methods. The GetOSDConfigurationOptionsResponse includes information about a capability of supporting a plurality of superimposing method. The operation of receiving the GetOSDConfigurationOptionsResponse is an operation of receiving a response as to the capability of supporting superimposing methods.

In the present embodiment, the client apparatus displays only options as OSD setting target categories transmitted from the monitoring camera. In the example illustrated in FIG. 5B, only the video source configuration, the video encoder configuration, the media profile, and the stream URI, which are transmitted from the monitoring camera, are displayed as options. In the present embodiment, a reference selection box 7010 is displayed close to a check box of a selected OSD setting target category. The reference selection box is a selection box for further selecting a particular target category from selected OSD setting target categories. In the example illustrated in FIG. 5B, the video source configuration is selected, and thus a list of video source configuration tokens possessed by the monitoring camera is displayed in the reference selection box 7010 in FIG. 5B.

In the case where the video source configuration is selected, video source configuration tokens are listed in the reference selection box 7010 as described above. On the other hand, in a case where the video encoder configuration is selected, video encoder configuration tokens are listed in the reference selection box 7010. In a case where a media profile is selected, video encoder configuration tokens are listed in the reference selection box 7010.

In a case where the stream URI is selected, if there are a plurality of streams being received by the client apparatus, corresponding URIs are listed. In a case where only one stream is being received, the URI of this stream is displayed.

The displaying operation performed by the client apparatus includes a step of analyzing a response as to the capability of supporting superimposing methods. The operation by a user to select one of displayed options includes a step of selecting one or more superimposing methods from a plurality of superimposing methods.

The OSD type setting frame 7001 is a frame for use in selecting an OSD type, that is, OSDType, to be displayed in the superimposing manner. In the example illustrated in FIG. 5B, TEXT is selected, and thus a text setting frame 7003 for setting details is enabled. In this case, an image setting frame 7004 is disabled such that a user is not allowed to use this frame for setting.

The frame 7002 for setting the OSD display position is a frame for use in specifying a position at which to display an OSD. Displaying positions selectable in this fame include UPPER_LEFT (upper left of the screen), UPPER_RIGHT (upper right of the screen), LOWER_LEFT (lower left of the screen), LOWER_RIGHT (lower right of the screen), and CUSTOM (position specified by coordinates). In the example illustrated in FIG. 5B, UPPER_LEFT (upper left of the screen) is selected.

In the present embodiment, in a case where CUSTOM is selected in the frame 7002 for setting the OSD display position, it is allowed to specify coordinates by dragging a pointer in a corresponding stream display window.

For example, a user may check a check box of CUSTOM in the frame 7002 for setting the OSD display position and then may specify two points in the first stream display window 6804. By this, it is possible to simultaneously specify an image on which to display an OSD and coordinates at which to display the OSD on the image.

As described above, the text setting frame 7003 is a frame for use in setting detailed data in a case where TEXT is selected in the OSD type setting frame. Selectable types of TEXT include a time and date (Time and Date) type, a bitrate (Bitrate) type, and a text string (Text String) type. In a case where the text string (Text String) type is selected, it is allowed to specify an arbitrary text string using a text input box.

The above-described OSD setting process according to the present embodiment is an operation of setting OSD information.

The image setting frame 7004 is a frame in which detailed data is displayed in a case where the image (IMAGE) is selected in the OSD type setting frame 7001. In the image setting frame 7004, a user is allowed to set an address of an image file to be displayed as an OSD by inputting the address in a text input box (Image File Path).

When the OSD creation button 7005 is pressed, the client apparatus issues a CreateOSD command to the monitoring camera, and, using the OSDToken returned in response to the CreateOSD command, the client apparatus executes a SetOSD command on the monitoring camera according to a content input by a user via the screen.

When the OSD modify button 7006 is pressed, the client apparatus 2000 executes the SetOSD command on the monitoring camera 1000 according to a content input by user via the present screen using OSDToken stored in advance.

When the OSD delete button 7007 is pressed, the client apparatus 2000 executes the DeleteOSD command on the monitoring camera 1000 using OSDToken stored in advance.

The operation of transmitting the SetOSD command and the operation of transmitting the DeleteOSD command include a step of transmitting OSD information to the image processing apparatus depending on a selected superimposing method.

In the client apparatus according to the present embodiment, as described above, only OSD setting target categories settable on the monitoring camera to be controlled are displayed in the OSD setting target selection frame 7000. However, in an alternative embodiment, among OSD setting target categories displayed in the OSD setting target selection frame 7000, only OSD setting target categories settable on the monitoring camera may be allowed to be set on the client apparatus. In this case, OSD setting target categories that are not settable on the monitoring camera are, for example, grayed out such that a user understands that they are not settable.

The above-described operations are described in further detail below with reference to FIG. 5C.

Figure 5C:
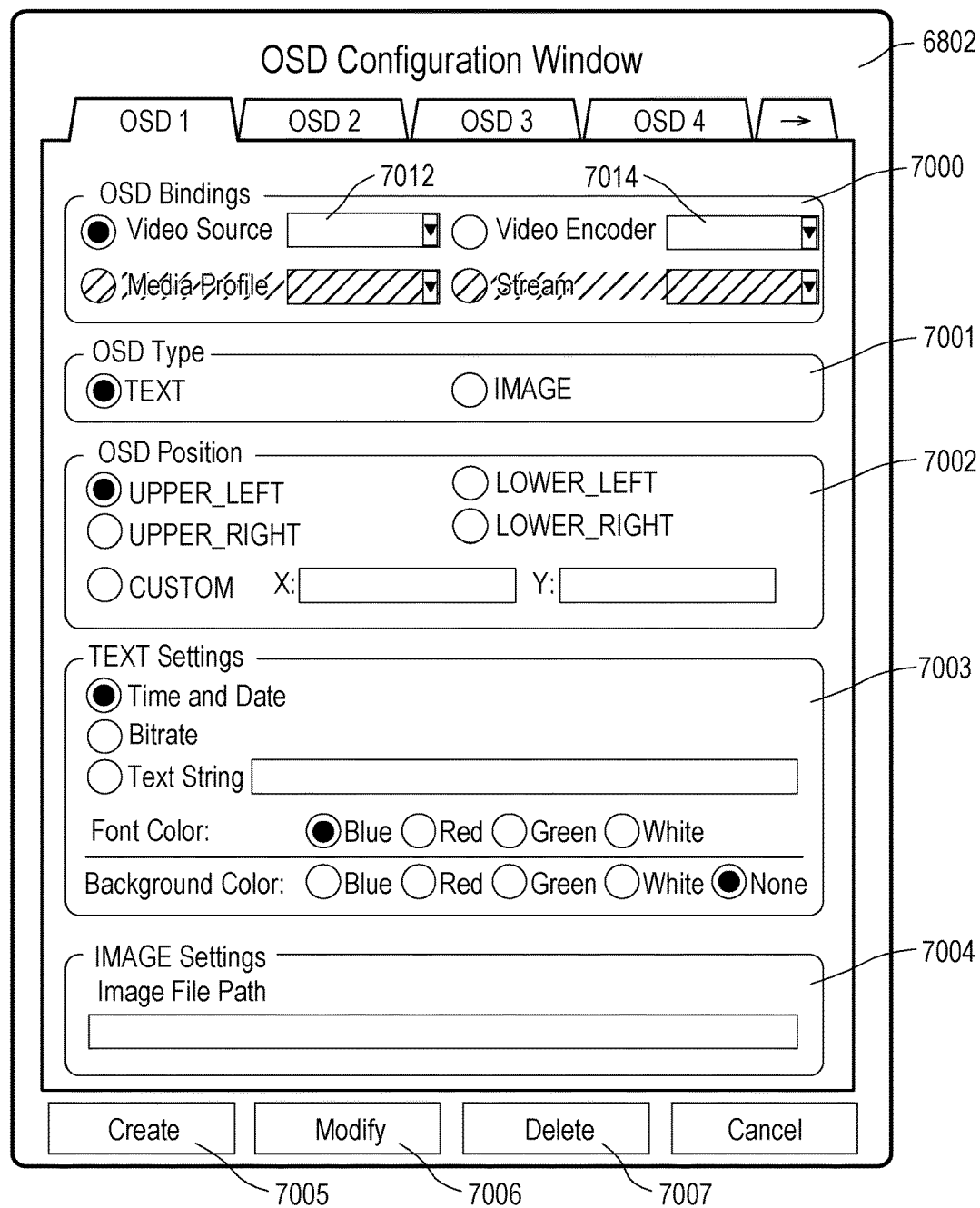
FIG. 5C is a diagram illustrating a graphical user interface (GUI) for setting an on-screen display (OSD) function of a client apparatus according to an embodiment.

In FIG. 5C, reference numerals similar to those in FIG. 5B are used to denote similar functions.

In FIG. 5C, reference numeral 7012 denotes a video source configuration token selection box, and reference numeral 7014 denotes a video encoder configuration token selection box.

In the GUI in FIG. 5C, a video source configuration and a video encoder configuration are transmitted as OSD-settable references from the monitoring camera to be controlled.

Note that in FIG. 5C, OSD-settable references that are not transmitted from the monitoring camera are grayed out and they are not allowed to be set. In the example illustrated in FIG. 5C, media profile and stream are not specified as OSD-settable references, and thus they are displayed in a grayed out manner and it is not allowed to set them.

In an alternative embodiment, the client apparatus may automatically select OSD setting target categories according to information indicating OSD setting target categories settable on the monitoring camera to be controlled. In this case, the OSD setting target selection frame 7000 may not be displayed in the OSD setting GUI of the client apparatus.

The information about OSD setting target categories settable on the monitoring camera is provided via the operation of transmitting the GetOSDConfigurationOptions command and the operation of receiving the GetOSDConfigurationOptionsResponse. The operation of transmitting the GetOSDConfigurationOptions command is an operation of inquiring the capability of supporting a plurality of superimposing methods. The GetOSDConfigurationOptionsResponse includes information about the capability of supporting a plurality of superimposing methods. The operation of receiving the GetOSDConfigurationOptionsResponse is an operation receiving a response as to the capability of supporting superimposing methods.

In this case, for example, the client apparatus according to the present embodiment selects an OSD setting target category such that an OSD is displayed on as many stream images as possible. In the present embodiment, the scope over which the OSD setting is applied decreases in order video source, video encoder, media profile, stream or snapshot.

For example, in a case where OSD setting is applied to the video source, the applying of the OSD setting to the video source causes an OSD to be displayed on all images transmitted.

In a case where OSD setting is applied to the video encoder, an OSD is displayed only on images encoded in a selected encoding method. For example, in a case where the video encoder is selected as the OSD setting target category and H.264 is further selected as a specific encoding method, an OSD is displayed only on images that are encoded in H.264 and transmitted.

Therefore, the client apparatus searches for OSD setting target category settable on the monitoring camera in order video source, video encoder, media profile, stream or snapshot. If a matched setting target category is found, then it is selected.

For example, in a case where the monitoring camera in the present embodiment supports OSD setting for video source, video encoder, and stream, the client apparatus in the present embodiment automatically selects video source and performs OSD setting for video source. For example, in a case where the monitoring camera supports OSD setting for video encoder and stream, the client apparatus automatically selects video encoder and performs OSD setting for video encoder.

In a case where there are a plurality of sub-categories in a category of setting targets supported by the monitoring camera, the client apparatus according to the present embodiment selects a sub-category that allows the setting to be applied over a greatest scope. For example, in a case where the monitoring camera supports video encoder as an OSD setting target category and supports a plurality of encoding methods thereof, the client apparatus automatically selects, as a sub-category, for example, an encoding method applied to a greatest number of output image streams. More specifically, for example, if the monitoring camera transmits two MJPEG streams and four H.264 streams, the client apparatus according to the present embodiment automatically selects H.264 as a sub-category to which the OSD setting is applied.

In the embodiment described above, although the client apparatus is configured to automatically select an OSD setting target category such that an OSD is displayed on as many stream images as possible, the client apparatus may be configured to automatically select an OSD setting target category such that an OSD is displayed on as few stream images as possible.

In this case, the client apparatus searches for OSD setting target categories settable on the monitoring camera in order stream or snapshot, media profile, video encoder, video source. If a matched setting target category is found, then it is selected.

For example, in a case where the monitoring camera in the present embodiment supports OSD setting for categories of video source, video encoder, and stream if the client apparatus is configured to automatically select an OSD setting target category such that an OSD is displayed on as few stream images as possible, then the client apparatus automatically selects stream as a category and performs OSD setting for the category of stream.

Alternatively, the client apparatus according to the present embodiment may be configured such that a selection box is provided on the OSD setting GUI so as to allow a user to select a wide or narrow scope over which the OSD setting is applied, and the client apparatus automatically selects an OSD setting target category according to the selection made by the user. In this case, if a user selects a wide scope, then the client apparatus selects an OSD setting target category such that an OSD is displayed on as many stream images as possible, as described above. On the other hand, in a case where a user selects a narrow scope, then the client apparatus selects an OSD setting target category such that the OSD is displayed on as few stream images as possible, as described above.

The above-described operation of automatically selecting an OSD setting target category is an operation of automatically selecting one superimposing method from a plurality of superimposing methods.

Figure 5D:
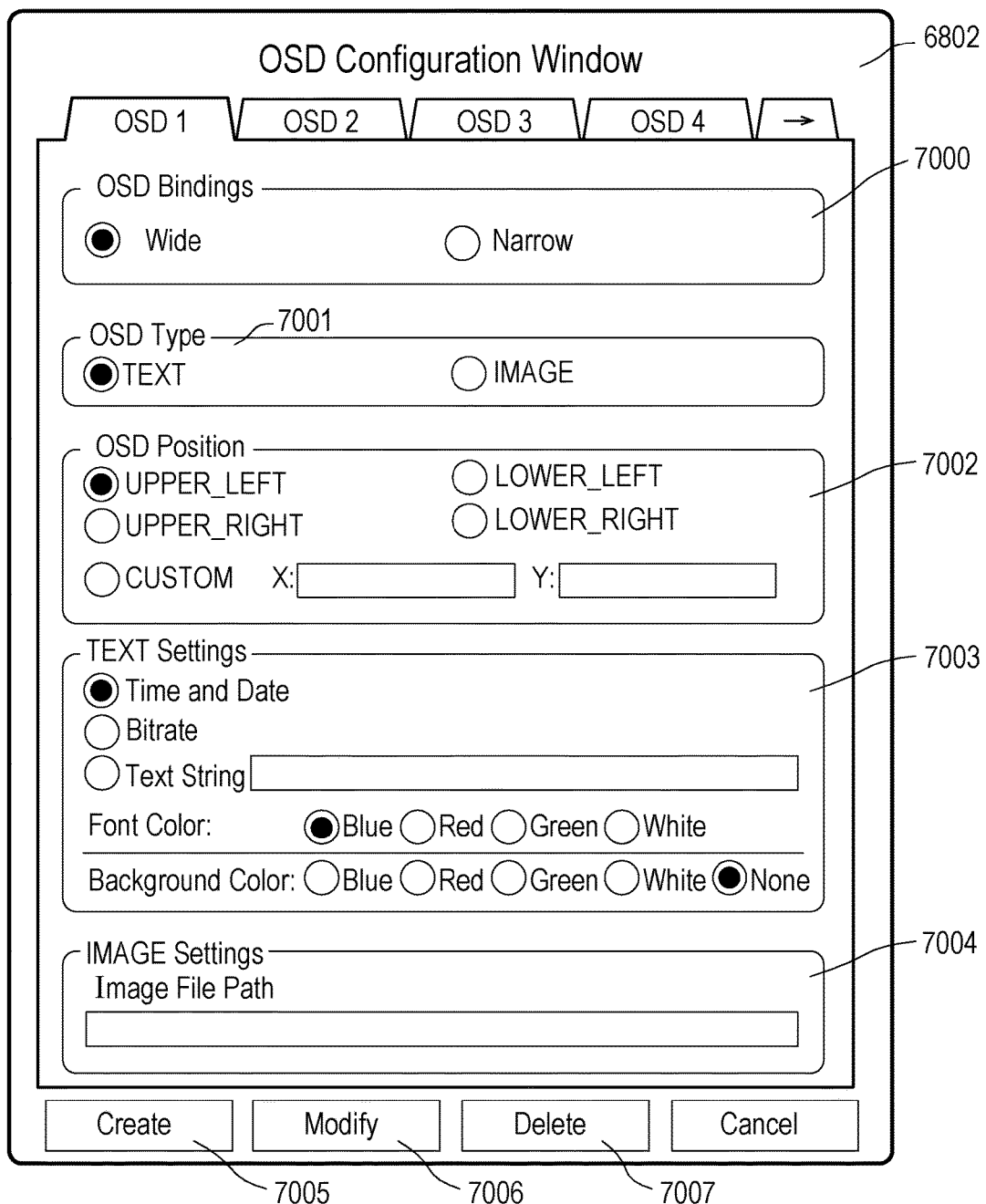
FIG. 5D is a diagram illustrating a graphical user interface (GUI) for setting an on-screen display (OSD) function of a client apparatus according to an embodiment.

FIG. 5D illustrates an example of an OSD setting GUI of the client apparatus.

In this example, a wide scope (Wide) selection check box and a narrow scope (Narrow) selection check box are provided in the OSD setting target selection frame 7000. These check boxes are configured such that a user is allowed to select either one of the wide scope selection check box and the narrow scope selection check box. When a check box is selected by a user, an indication is displayed to indicate that the check box is selected. In the example illustrated in FIG. 5D, an indication is displayed to indicate that the wide scope selection check box is selected.

When the wide scope selection check box is selected by a user as illustrated in FIG. 5D, the client apparatus according to the present embodiment selects an OSD setting target category from information representing target categories transmitted from the monitoring camera such that an OSD is displayed on as many stream images as possible. In a case where the narrow scope selection check box is selected by a user, the client apparatus according to the present embodiment selects an OSD setting target category from information representing target categories transmitted from the monitoring camera such that an OSD is displayed on as few stream images as possible.

When the OSD create button 7005 is pressed, the client apparatus 2000 issues the CreateOSD command to the monitoring camera 1000. Subsequently, using OSDToken returned in response to the CreateOSD command, the client apparatus 2000 executes the SetOSD command on the monitoring camera 1000 according to a content input by the user via the screen illustrated in FIG. 5D.

When the OSD modify button 7006 is pressed, the client apparatus 2000 executes the SetOSD command on the monitoring camera 1000 according to a content input by user via the present screen OSDToken stored in advance.

When the OSD delete button 7007 is pressed, the client apparatus 2000 executes the DeleteOSD command on the monitoring camera 1000 using OSDToken stored in advance.

The operation of transmitting the SetOSD command and the operation of transmitting the DeleteOSD command include a step of transmitting OSD information to the image processing apparatus depending on a selected superimposing method.

Next, referring to FIGS. 6A and 6B, a process of selecting an OSD setting target by a client apparatus according to an embodiment is described below.

Figure 6A:
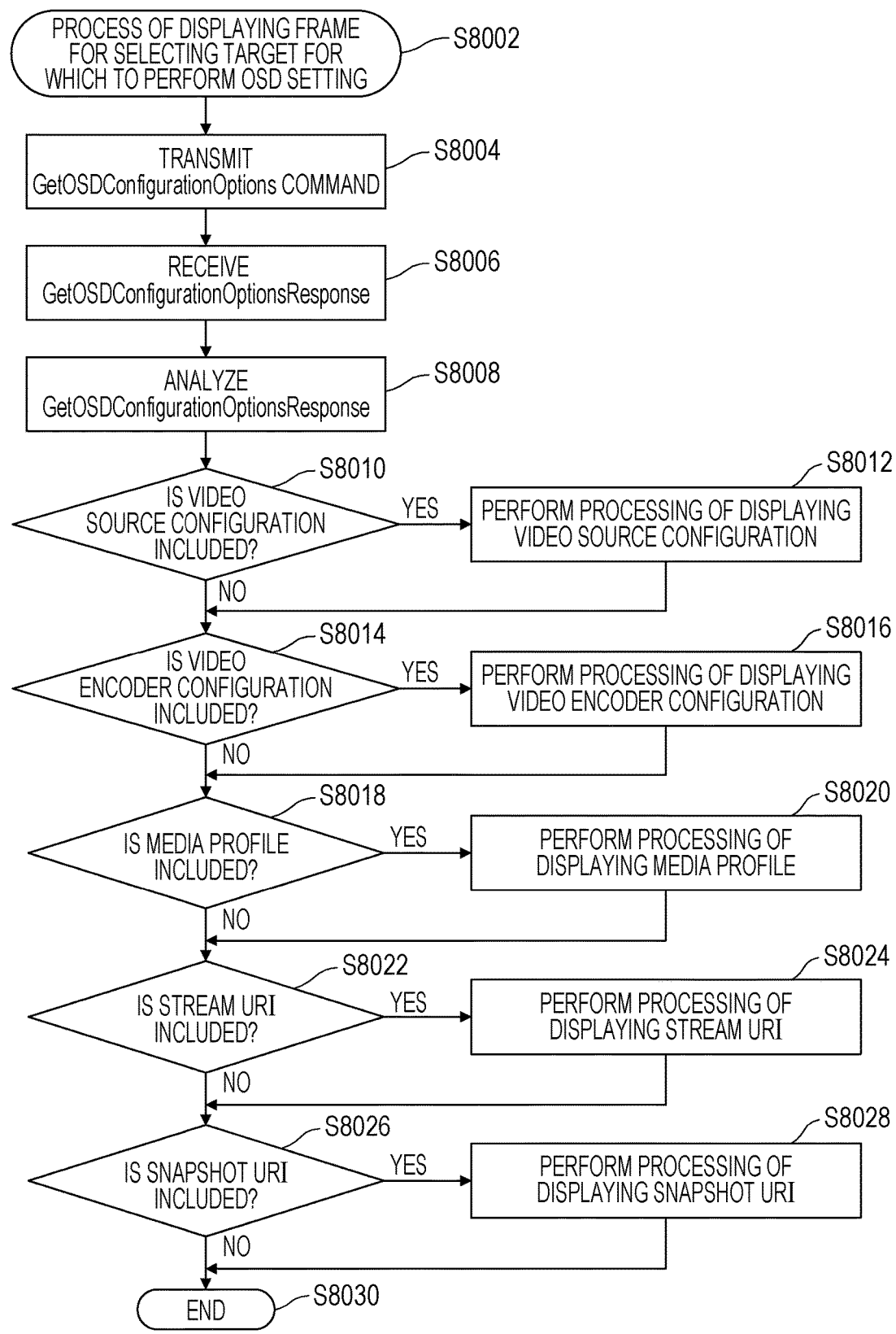
FIG. 6A is a flow chart illustrating a process by a client apparatus to select a target category for which to perform on-screen display (OSD) setting according to an embodiment.

FIG. 6A is a flow chart illustrating a process performed by the client apparatus to display a GUI for use in selecting an OSD setting target according to the present embodiment. In the present embodiment, the client apparatus is configured to use this GUI to select an OSD setting target category.

In step S8002 in FIG. 6A, the process of displaying the OSD setting target selection frame according to the present embodiment is started. Next, in step S8004, a GetOSDConfigurationOptions command is transmitted from the client apparatus according to the present embodiment. Next, in step S8006, GetOSDConfigurationOptionsReponse is transmitted from the monitoring camera according to the present embodiment, and the client apparatus receives this response.

The operation of transmitting the GetOSDConfigurationOptions command is an operation of inquiring a capability of supporting a plurality of superimposing methods. The GetOSDConfigurationOptionsResponse includes information about a capability of supporting a plurality of superimposing method. The above-described operation of receiving the GetOSDConfigurationOptionsResponse is an operation of receiving a response as to the capability of supporting superimposing methods.

Next, in step S8008, the received GetOSDConfigurationOptionsReponse is analyzed by the client apparatus according to the present embodiment. The operation of analyzing the received GetOSDConfigurationOptionsReponse includes a step of analyzing a response as to a capability of supporting superimposing methods. The process of displaying the OSD setting target selection frame is performed according to a result of the analysis in step S8008. The process of displaying the OSD setting target selection frame is described below.

Next, in step S8010, it is determined whether the received GetOSDConfigurationOptionsReponse includes an option in terms of the video source configuration. In a case where it is determined in step S8010 that the received GetOSDConfigurationOptionsReponse includes an option in terms of the video source configuration, the processing flow proceeds to step S8012. In step S8012, a displaying process associated with video source configuration is performed, and the GUI is accordingly changed.

Next, in step S8014, it is determined whether the received GetOSDConfigurationOptionsReponse includes an option in terms of the video encoder configuration. In a case where it is determined in step S8014 that the received GetOSDConfigurationOptionsReponse includes an option in terms of the Video Encoder Configuration, the processing flow proceeds to step S8016. In step S8016, a display process as to the video encoder configuration is performed and the GUI is accordingly changed.

Next, in step S8018, it is determined whether the received GetOSDConfigurationOptionsReponse includes an option in terms of the media profile. In a case where it is determined in step S8018 that the received GetOSDConfigurationOptionsReponse includes an option in terms of the media profile, the processing flow proceeds to step S8020. In step S8020, a display process as to the media profile is performed and the GUI is accordingly changed.

Next, in step S8022, it is determined whether the received GetOSDConfigurationOptionsReponse includes an option in terms of the Stream URI. In a case where it is determined in step S8022 that the received GetOSDConfigurationOptionsReponse includes an option in terms of the stream URI, the processing flow proceeds to step S8024. In step S8024, a display process as to the stream URI is performed and the GUI is accordingly changed.

Next, in step S8026, it is determined whether the received GetOSDConfigurationOptionsReponse includes an option in terms of the snapshot URI. In a case where it is determined in step S8026 that the received GetOSDConfigurationOptionsReponse includes an option in terms of the snapshot URI, the processing flow proceeds to step S8028. In step S8028, a display process as to the snapshot URI is performed and the GUI is accordingly changed.

Next, in step S8030, the process of displaying the OSD setting target selection frame according to the present embodiment is ended.

In the present embodiment, after the operation described above is ended, if the OSD create button 7005 is pressed, the client apparatus issues a CreateOSD command to the monitoring camera. Subsequently, using OSDToken returned in response to the create OSD command, the client apparatus executes the SetOSD command on the monitoring camera according to a content input by the user via the present screen.

In a case where the OSD modify button 7006 is pressed, the client apparatus 2000 executes the SetOSD command on the monitoring camera 1000 according to a content input by user via the present screen using OSDToken stored in advance.

In a case where the OSD delete button 7007 is pressed, the client apparatus 2000 executes the DeleteOSD command on the monitoring camera 1000 using OSDToken stored in advance.

The operation of transmitting the SetOSDcommand and the operation of transmitting the DeleteOSD command include a step of transmitting OSD information to the image processing apparatus depending on the selected superimposing method. As described above, the client apparatus may be configured to automatically select an OSD setting target. In this case, the client apparatus may perform the process of selecting an OSD setting target in a manner described below with reference to FIG. 6B.

Figure 6B:
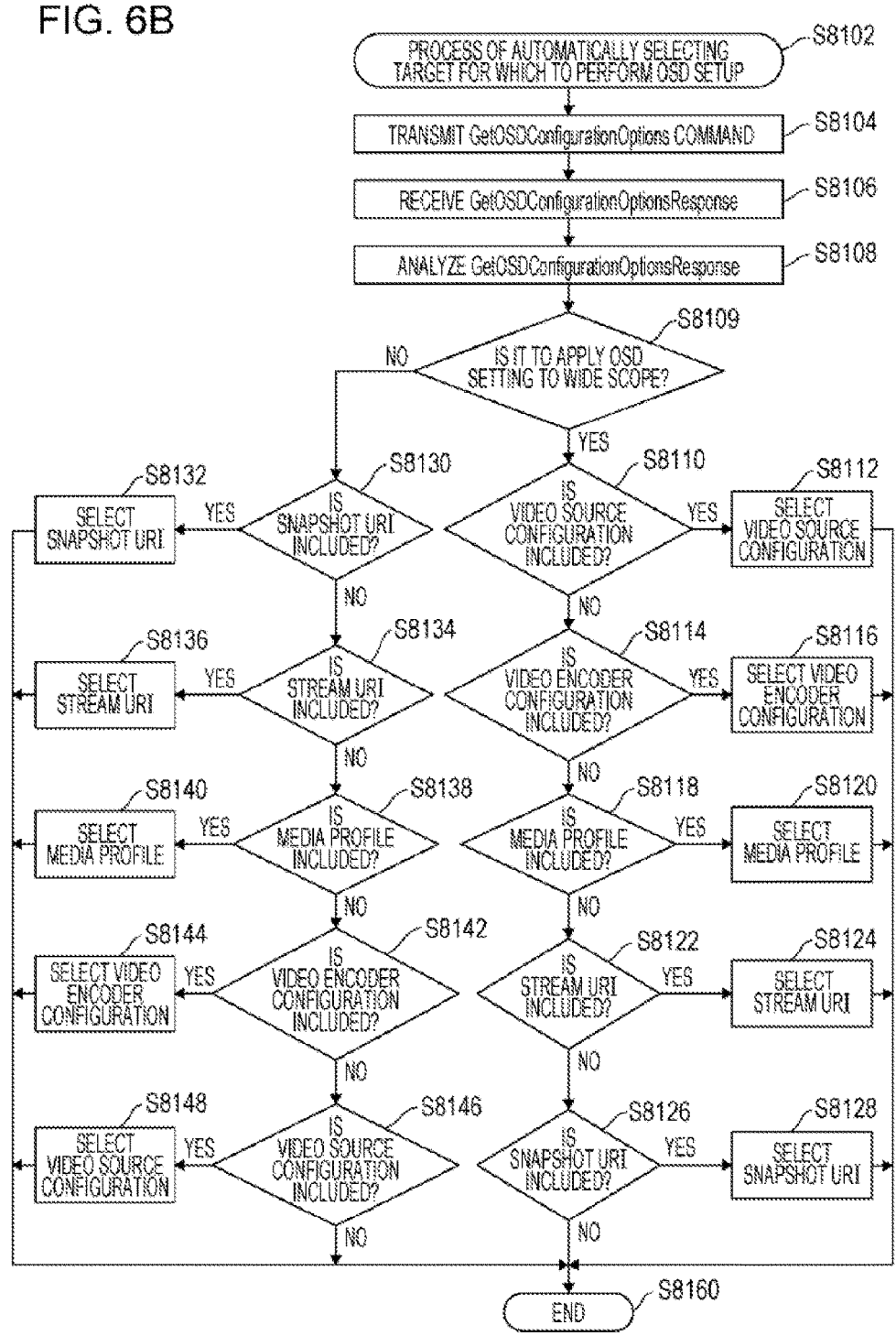
FIG. 6B is a flow chart illustrating a process by a client apparatus to select a target category for which to perform on-screen display (OSD) setting according to an embodiment.

FIG. 6B is a flow chart illustrating the process of selecting an OSD setting target with a GUI.

In FIG. 6B, in step S8102, the process of automatically selecting an OSD setting target according to the present embodiment is started. Next, in step S8104, a GetOSDConfigurationOptions command is transmitted by the client apparatus according to the present embodiment. Next, in step S8106, GetOSDConfigurationOptionsReponse is transmitted from the monitoring camera according to the present embodiment, and the client apparatus receives this response.

Next, in step S8108, the received GetOSDConfigurationOptionsReponse is analyzed by the client apparatus according to the present embodiment.

Next, in step S8109, the state of the wide scope selection check box and the state of the narrow scope selection check box on the OSD setting GUI are checked. In a case where the wide scope selection check box is selected, the processing flow proceeds to step S8110. On the other hand, in a case where the narrow scope selection check box is selected, the processing flow proceeds to step S8130.

Next, in step S8110, it is determined whether the received GetOSDConfigurationOptionsReponse includes an option in terms of video source configuration.

In a case where it is determined in step S8110 that the received GetOSDConfigurationOptionsReponse includes an option in terms of video source configuration, the processing flow proceeds to step S8112. In step S8112, a process is performed to set the OSD setting target to the video source configuration and the GUI is accordingly changed.

In a case where it is determined in step S8110 described above that the received GetOSDConfigurationOptionsReponse includes no option in terms of video source configuration, the processing flow proceeds to step S8114.

In step S8114, it is determined whether the received GetOSDConfigurationOptionsReponse includes an option in terms of the video encoder configuration.

In a case where it is determined in step S8114 that the received GetOSDConfigurationOptionsReponse includes an option in terms of the video encoder configuration, the processing flow proceeds to step S8116. In step S8116, a process is performed to set the OSD setting target to the video encoder configuration and the GUI is accordingly changed.

In a case where it is determined in step S8114 that the received GetOSDConfigurationOptionsReponse includes no option in terms of the video encoder configuration, the processing flow proceeds to step S8118.

Next, in step S8118, it is determined whether the received GetOSDConfigurationOptionsReponse includes an option in terms of the media profile.

In a case where it is determined in step S8118 that the received GetOSDConfigurationOptionsReponse includes an option in terms of the media profile, the processing flow proceeds to step S8120. In step S8120, a process is performed to set the OSD setting target to the media profile, and the GUI is accordingly changed.

In a case where it is determined in step S8118 that the received GetOSDConfigurationOptionsReponse includes no option in terms of the media profile, the processing flow proceeds to step S8122.

Next, in step S8122, it is determined whether the received GetOSDConfigurationOptionsReponse includes an option in terms of the stream URI.

In a case where it is determined in step S8122 that the received GetOSDConfigurationOptionsReponse includes an option in terms of the stream URI, the processing flow proceeds to step S8124. In step S8124, a process is performed to set the OSD setting target to the stream URI and the GUI is accordingly changed.

Next, in step S8126, it is determined whether the received GetOSDConfigurationOptionsReponse includes an option in terms of the snapshot URI.

In a case where it is determined in step S8122 that the received GetOSDConfigurationOptionsReponse includes no option in terms of the stream URI, the processing flow proceeds to step S8126.

In a case where it is determined in step S8126 that the received GetOSDConfigurationOptionsReponse includes an option in terms of the snapshot URI, the processing flow proceeds to step S8128. In step S8128, a process is performed to set the OSD setting target to the snapshot URI and the GUI is accordingly changed.

In a case where it is determined in step S8126 that the received GetOSDConfigurationOptionsReponse includes no option in terms of the snapshot URI, then in next step S8160, the process of automatically selecting the OSD setting target according to the present embodiment is ended.

On the other hand, in a case where it is determined in step S8109 that the narrow scope selection check box is not selected, the processing flow proceeds to step S8130 as described above.

In step S8130, as in step S8126 described above, it is determined whether the received GetOSDConfigurationOptionsReponse includes an option in terms of the snapshot URI.

In a case where it is determined in step S8130 that the received GetOSDConfigurationOptionsReponse includes an option in terms of the snapshot URI, the processing flow proceeds to step S8132. In step S8132, a process is performed to set the OSD setting target to the snapshot URI and the GUI is accordingly changed.

In a case where it is determined in step S8130 that the received GetOSDConfigurationOptionsReponse includes no option in terms of the snapshot URI, the processing flow proceeds to step S8134.

Next, in step S8134, it is determined whether the received GetOSDConfigurationOptionsReponse includes an option in terms of the stream URI.

In a case where it is determined in step S8134 that the received GetOSDConfigurationOptionsReponse includes an option in terms of the stream URI, the processing flow proceeds to step S8136. In step S8136, a process is performed to set the OSD setting target to the stream URI and the GUI is accordingly changed.

In a case where it is determined in step S8134 that the received GetOSDConfigurationOptionsReponse includes no option in terms of the Stream URI, the processing flow proceeds to step S8138.

Next, in step S8138, it is determined whether the received GetOSDConfigurationOptionsReponse includes an option in terms of the media profile.

In a case where it is determined in step S8138 that the received GetOSDConfigurationOptionsReponse includes an option in terms of the media profile, the processing flow proceeds to step S8140. In step S8140, a process is performed to set the OSD setting target to the media profile, and the GUI is accordingly changed.

In a case where it is determined in step S8138 that the received GetOSDConfigurationOptionsReponse includes no option in terms of the media profile, the processing flow proceeds to step S8142.

In step S8142, it is determined whether the received GetOSDConfigurationOptionsReponse includes an option in terms of the video encoder configuration.

In a case where it is determined in step S8142 that the received GetOSDConfigurationOptionsReponse includes an option in terms of the Video Encoder Configuration, the processing flow proceeds to step S8144. In step S8144, a process is performed to set the OSD setting target to the video encoder configuration and the GUI is accordingly changed.

In a case where it is determined in step S8142 that the received GetOSDConfigurationOptionsReponse includes no option in terms of the video encoder configuration, the processing flow proceeds to step S8146.

Next, in step S8146, it is determined whether the received GetOSDConfigurationOptionsReponse includes an option in terms of video source configuration.

In a case where it is determined in step S8146 that the received GetOSDConfigurationOptionsReponse includes an option in terms of video source configuration, the processing flow proceeds to step S8148. In step S8148, a process is performed to set the OSD setting target to the video source configuration and the GUI is accordingly changed.

In a case where it is determined in step S8146 that the received GetOSDConfigurationOptionsReponse includes no option in terms of video source configuration, then in step S8160, the process of automatically selecting an OSD setting target is ended.

In the present embodiment, after the operation described above, if the OSD create button 7005 is pressed, the client apparatus issues a CreateOSD command to the monitoring camera. Using OSDToken returned in response to the CreateOSD command, the client apparatus executes the SetOSD command on the monitoring camera according to a content input by the user via the present screen.

In a case where the OSD modify button 7006 is pressed, the client apparatus 2000 executes the SetOSD command on the monitoring camera 1000 according to a content input by user via the present screen using OSDToken stored in advance.

In a case where the OSD delete button 7007 is pressed, the client apparatus 2000 executes the DeleteOSD command on the monitoring camera 1000 using OSDToken stored in advance.

The operation of transmitting the SetOSD command and the operation of transmitting the DeleteOSD command include a step of transmitting OSD information to the image processing apparatus depending on a selected superimposing method.

FIGS. 7A to 7H are diagrams illustrating examples of descriptions of OSDConfiguration, which is a data type according to the present embodiment.

The data type illustrated in FIGS. 7A to 7H is defined using, for example, a XML schema definition language (hereinafter referred to as XSD). The OSDConfiguration type is a data type used in a step of setting OSD information.

FIG. 7A illustrates an example of a definition of the OSDConfiguration type.

As illustrated in FIG. 7A, the OSDConfiguration type is defined as a complex type by a complexType declaration in XML. In this example, a complexContent element and an extension element and a base attribute thereof define that the OSDConfiguration type is an extension type of a DeviceEntity type. Furthermore, in this OSDConfiguration type, data extension is performed by defining, using sequence, data elements that appear in an order defined herein.

The OSDConfiguration type illustrated in FIG. 7A is a data type used in the GetOSD response or the SetOSD command illustrated in FIG. 4B.

FIG. 7B illustrates an example of a definition of an OSDReference type.

In data of the OSDReference type, choice elements described therein define that one of choice elements is allowed to be selected. In the specific example of the data of the OSDReference type illustrated in FIG. 7B, the description thereof defines that data of either one of ReferenceToken type or anyURI type is allowed to appear in the OSDReference type.

As the ReferenceToken type, it is allowed to specify VideoSourceConfigurationToken, VideoEncoderConfigurationToken, or MediaProfileToken.

Furthermore, in the present embodiment, as the anyURI type, it is allowed to specify StreamURI or SnapshotURI. In the present embodiment, the OSDReference type described above is a data type for specifying an OSD setting target.

FIG. 7C illustrates an example of a definition of the OSDType type.

In this example of the definition of the OSDType type, a simplerType element defines that the OSDType type is configured as a simple type in XML, and a restriction element and a base attribute thereof define that the OSDType type is configured as a value-restricted type of a string type. In the example illustrated in FIG. 7C, the OSDType type is allowed to take TEXT or IMAGE as its value.

FIG. 7D illustrates an example of a definition of an OSDPosConfiguration type.

In this example of the definition of the OSDPosConfiguration type, a complexType element defines that the OSDPosConfiguration type is a complex type. Furthermore, sequence elements define data elements that appear in an order defined herein.

FIG. 7E illustrates an example of a definition of an OSDTextConfiguration type.

In this example of the definition of the OSDTextConfiguration type, a complexType element defines that the OSDTextConfiguration type is a complex type. Furthermore, sequence elements define data elements that appear in an order defined herein.

FIG. 7F illustrates an example of a definition of an OSDImageConfiguration type. In this example of the definition of the OSDImageConfiguration type, a complexType element defines that the OSDImageConfiguration type is a complex type. Furthermore, sequence elements define data elements that appear in an order defined herein.

FIG. 7G illustrates an example of a definition of a Vector type. In the Vector type, attribute elements define attributes of x and y of a float type.

FIG. 7H illustrates an example of a definition of a Color type. In the Color type, attribute elements define attributes of X, Y, and Z of the float type. Furthermore, use="required" specifies that the attributes X, Y, and Z are required in the Color type. Furthermore, in the Color type, an attribute of ColorSpace of the anyURI type is allowed to be defined by an attribute element.

FIG. 7I illustrates an example of a definition of a BackgroundColor type. In the BackgroundColor type, a complexType element defines that the BackgroundColor type is a complex type. Furthermore, sequence elements define data elements that appear in an order defined herein. That is, the sequence elements specify data elements of the Color type. Furthermore, in this type, it is allowed to specify an attribute of Transparent of an int type.

The client apparatus according to the present embodiment acquires OSD setting information from the image pickup apparatus according to the present embodiment by using data of the OSDConfiguration type described above. Furthermore, the client apparatus according to the present embodiment performs the OSD setting on the image pickup apparatus according to the present embodiment by using data of the OSDConfiguration type described above.

Next, referring to FIGS. 8A to 8H, examples of definitions of the OSDConfigurationOptions type are described. This OSDConfigurationOptions type is a data type used in a step of receiving a response indicating a capability of supporting superimposing methods.

FIG. 8A illustrates an example of a definition of the OSDConfigurationOptions type. In the OSDConfigurationOptions type, a complexType element defines that the OSDConfigurationOptions type is a complex type. Furthermore, sequence elements define data elements that appear in an order defined herein.

The OSDConfigurationOptions type is used in transmitting a GetOSDConfigurationOptions response illustrated, for example, in FIG. 4B. From the GetOSDConfigurationOptions response, the client apparatus according to the present embodiment acquires information about the capability of the monitoring camera of interest in terms of the OSD setting target.

In the OSDConfigurationOptions type, a first field defines OSDReferenceOptions of the OSDReferenceOptions type. A next field defines MaximumNumberOfOSDs of the int type. A further next field defines a type of OSDtype. A further next field defines PositionOption of the sting type. A further next field defines TextOption of an OSDTextOptions type. The last field defines ImageOption of an OSDImageOptions.

The OSDReferenceOptions type described above is a data type used in transmitting and receiving data representing the capability associated with OSD setting targets according to the present embodiment.

In the field of the type and each field of PositionOption, an identifier maxOccurs="unbounded" defines that a plurality of definitions are allowed to be described in the OSDConfigurationOptions type. Furthermore, in each field of OSDReferenceOptions, TextOption, and ImageOption, it is defined by an identifier minOccurs="0" that it is allowed to omit definition.

FIG. 8B illustrates an example of a definition of the OSDReferenceOptions type. This OSDReferenceOptions type is a data type used in defining OSDReferenceOptions in a first field in FIG. 8B. In the OSDReferenceOptions type, a complexType element defines that the OSDReferenceOptions type is a complex type. Furthermore, sequence elements define data elements that appear in an order defined herein. In the OSDReferenceOptions type, a first field defines OSDReference of the OSDReference type. In this field, an identifier maxOccurs="unbounded" defines that a plurality of definitions are allowed to be described in the OSDReference type.

The OSDReference type used in the OSDReferenceOptions type in FIG. 8B is the same data type as that illustrated in FIG. 7B. In the OSDReference type, as described above, choice elements described therein define elements one of which is allowed to be selected. For example, in data of the OSDReference type, data of either one of ReferenceToken type or anyURI type is allowed to appear.

As the ReferenceToken type, it is allowed to specify VideoSourceConfigurationToken, VideoEncoderConfigurationToken, or MediaProfileToken.

Furthermore, in the present embodiment, as the anyURI type, it is allowed to specify StreamURI or SnapshotURI.

In the OSDReference type, as described above, one of OSD setting target categories is allowed to be specified using data of the ReferenceToken type or the anyURI type.

In the OSDReferenceOptions type, as described above, it is allowed to describe a plurality of pieces of data of the OSDReference type, and thus, in the OSDConfigurationOptions type, it is allowed to list a plurality of OSD setting target categories.

In the analysis of GetOSDConfigurationOptions in step S8008 in FIG. 6A described above, the field of the OSDReferenceOptions type is analyzed. In the analysis of GetOSDConfigurationOptions in step S8108 in FIG. 6B described above, the analysis is performed mainly on the field of the OSDReferenceOptions type.

FIG. 8C illustrates an example of a definition of the OSDTextOptions type. In the OSDTextOptions type, a complexType element defines that the OSDTextOptions type is a complex type. Furthermore, sequence elements define data elements that appear in an order defined herein.

In the OSDTextOptions type, a first field a field defining the type of OSDType. A next field defines FontSizeRange of an IntRange type. A further next field defines DateFormat of the string type. A further next field defines TimeFormat of the string type as with the DateFormat. A further next field defines Color of the ColorOptions type. The last field defines Transparent of the IntRange type.

In the Type field, the DateFormat field, and the TimeFormat field, it is defined by an identifier maxOccurs="unbounded" that a plurality of definitions are allowed to be described in the OSDTextOptions type.

In the DateFormat field, the TimeFormat field, the Color field, and the Transparent field, it is defined by an identifier minOccurs="0" that there it is allowed to omit definition.

FIG. 8D illustrates an example of a definition of the OSDImageOptions type. In the OSDImageOptions type, a complexType element defines that the OSDImageOptions type is a complex type. Furthermore, sequence elements define elements that appear in an order defined herein.

In the OSDImageOptions type, a first field defines ImagePath of the anyURI type. In the ImagePath field, an identifier maxOccurs="unbounded" defines that a plurality of definitions are allowed to be described in the OSDImageOptions type.

FIG. 8E illustrates an example of a definition of an IntRange type. In the IntRange type, a complexType element defines that the IntRange type is a complex type. Furthermore, sequence elements define elements that appear in an order defined herein.

In the IntRange type, a first field defines Min of the int type. The last field defines Max of the int type.

FIG. 8F illustrates an example of a definition of the ColorOptions type. In the ColorOptions type, a complexType element defines that the ColorOptions type is a complex type. Furthermore, sequence elements define elements that appear in an order defined herein. Choice elements described in a sequence element define elements one of which is allowed to be selected. More specifically, in the ColorOptions type, an element is selected from a ColorList field or a ColorspaceRange field, which will be described later.

In the ColorOptions type, as described above, one of options is the ColorList field of the Color type, and the other one of the options is the ColospaceRange field of the ColospaceRange type. In the ColorList field and the ColospaceRange field, it is defined by an identifier maxOccurs="unbounded" that a plurality of definitions are allowed in each of them.

FIG. 8G illustrates an example of a definition of the ColospaceRange type. In the ColospaceRange type, a complexType element defines that the ColospaceRange type is a complex type. Furthermore, sequence elements define elements that appear in an order defined herein.

In the ColospaceRange type, a first field is an X field. A next field is a Y field, A third filed is a Z filed. The X field, the Y filed, and the Z field are all data of the FloatRange type. In the ColospaceRange type, the last field defines Colorspace of the anyURI type.

FIG. 8H illustrates an example of a definition of the FloatRange type. In the definition of the FloatRange type, a complexType element defines that the FloatRange type is a complex type. Furthermore, sequence elements define elements that appear in an order defined herein.

In the definition of the FloatRange type, a first field defines Min of the float type, and the last field defines Max of the float type.

In the present embodiment, the client apparatus acquires, from the image pickup apparatus, information about the OSD settable on the image pickup apparatus by using data of the OSDConfigurationOptions type described above. Furthermore, in the image pickup apparatus according to the present embodiment, the data of the OSDConfigurationOptions type described above is used to transmit information about the capability of the image pickup apparatus in terms of the OSD.

Next, referring to FIGS. 9A to 9D, the GetOSDConfigurationOptions command according to the present embodiment and GetOSDConfigurationOptionsResponse, which is a response to the GetOSDConfigurationOptions command, are described below.

As described above, the information about OSD setting targets settable on the monitoring camera is provided via the transmission of the GetOSDConfigurationOptions command and the reception of the GetOSDConfigurationOptionsResponse. The operation of transmitting the GetOSDConfigurationOptions command is an operation of inquiring the capability of supporting a plurality of superimposing methods. The GetOSDConfigurationOptionsResponse includes information about a capability of supporting a plurality of superimposing methods. The operation of receiving the GetOSDConfigurationOptionsResponse is an operation receiving a response as to the capability of supporting superimposing methods.

FIG. 9A illustrates an example of a definition of the GetOSDConfigurationOptions command type. The GetOSDConfigurationOptions command is a command used by the client apparatus according to the present embodiment to get a list of setting options associated with the OSD from the monitoring camera. In response to the GetOSDConfigurationOptions command, the monitoring camera according to the present embodiment returns information about the capability associated with the OSD to the client apparatus.

As illustrated in FIG. 9A, the GetOSDConfigurationOptions command may include, as a parameter, an OSDReference field of the OSDRedference type. In the OSDReference field, it is allowed to define by an identifier minOccurs="0" that this field is optional. In this OSDReference field, a token of an OSD setting target is specified.

By using the OSDReference field, the client apparatus is allowed to request setting options associated with only the particular OSD setting target specified by a user as a response to the GetOSDConfigurationOptions command.

FIG. 9B illustrates an example of a definition of GetOSDConfigurationOptionsResponse. As described above, the monitoring camera according to the present embodiment transmits information about the capability associated with the OSD setting to the client apparatus by using GetOSDConfigurationOptionsResponse.

As illustrated in FIG. 9B, GetOSDConfigurationOptionsResponse includes, as a parameter, an OSDConfigurationOptions field. This field is data of the OSDConfigurationOptions type.

FIG. 9C illustrates an example of a configuration of the GetOSDConfigurationOptions command. In this example illustrated in FIG. 9C, the GetOSDConfigurationOptions command is configured such that the optional OSDReference field described above is not included.

FIG. 9D illustrates an example of a configuration of GetOSDConfigurationOptionsReponse, which is a response to the GetOSDConfigurationOptions command.

As described in FIG. 9D, the monitoring camera according to the present embodiment notifies the client apparatus of the OSD setting targets allowed in the monitoring camera by listing them in OSDReference fields in the OSDReferenceOptions field.

In the example illustrated in FIG. 9D, VCS0, which is a token of VideoSourceConfigurationToken, is defined as one of OSD setting targets. Furthermore, tokens of video encoder configuration are defined as MJPEG0, MJPEG1, H.264_0, H.264_1, and MPEG4_0. Stream URI of a stream is defined as "rtsp://192.168.100.1/OSDstream/".

When GetOSDConfigurationOptionsReponse illustrated in FIG. 9D is received, then, for example, VSC0 is displayed as an option in the selection box 7012 the GUI illustrated in FIG. 5C.

Furthermore, in the video encoder configuration token selection box 7014, MJPEG0, MJPEG1, H.264_0, H.264_1, and MPEG4_0 are displayed as options. The stream selection box is displayed without being grayed out, and "rtsp://192.168.100.1/OSDstream/" is displayed as an option in a video encoder/stream URI selection box with no reference numeral.

Figure 10:
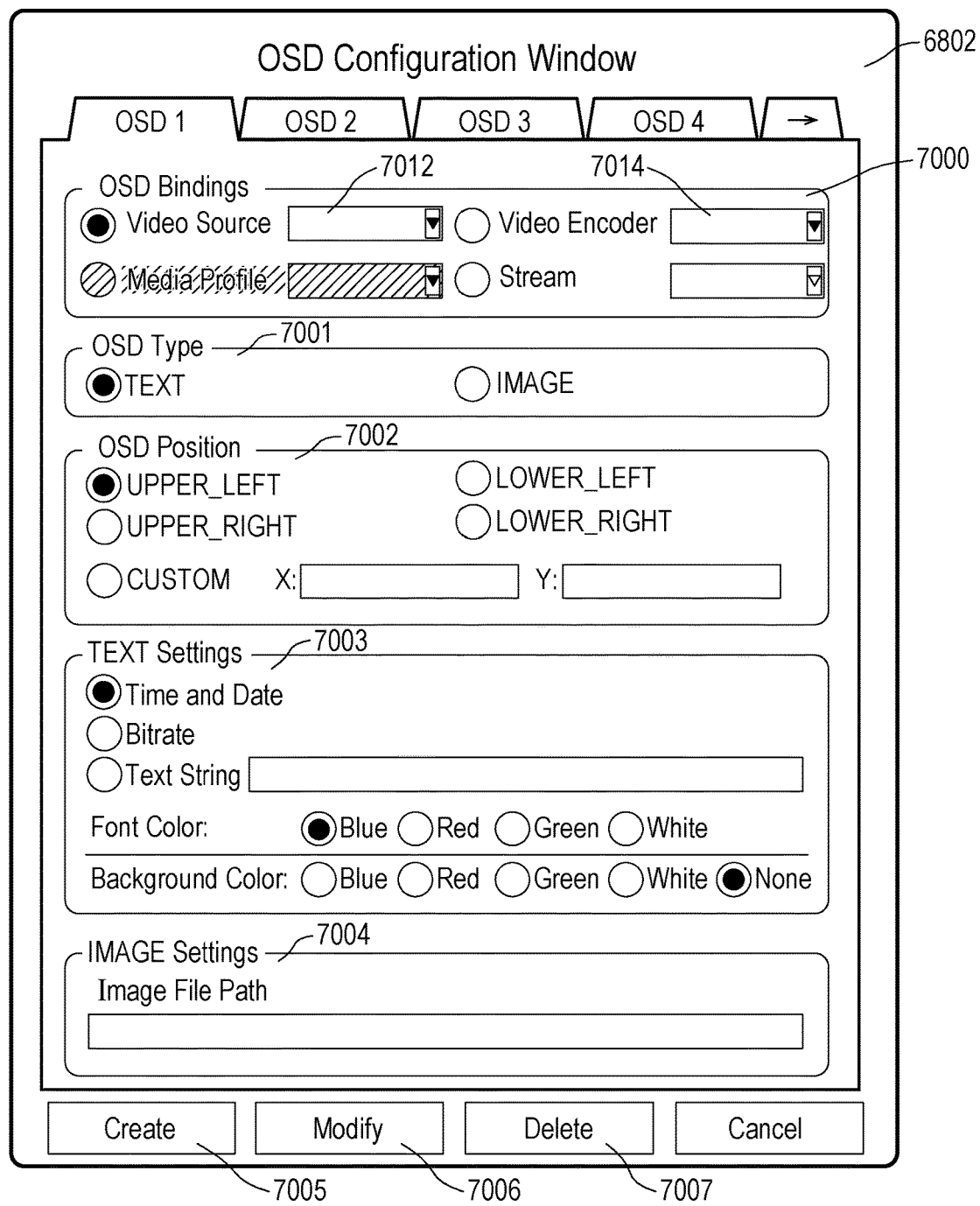
FIG. 10 is a diagram illustrating a graphical user interface (GUI) for setting an on-screen display (OSD) of a client apparatus according to an embodiment.

As a result of the displaying operation, the GUI of the client apparatus is displayed, for example, as illustrated in FIG. 10.

In the case where GetOSDConfigurationOptionsReponse illustrated in FIG. 9D is received, the OSD setting target selection GUI of the client apparatus illustrated in FIG. 51) operates as follows.

For example, in a case where the wide scope selection check box is selected by a user, VSC0, which is a video source configuration token, is selected as an OSD setting target. On the other hand, in a case where the narrow scope selection check box is selected by a user, "rtsp://192.168.100.1/OSDstream/", representing a stream URI, is selected as an OSD setting target.

Figure 11:
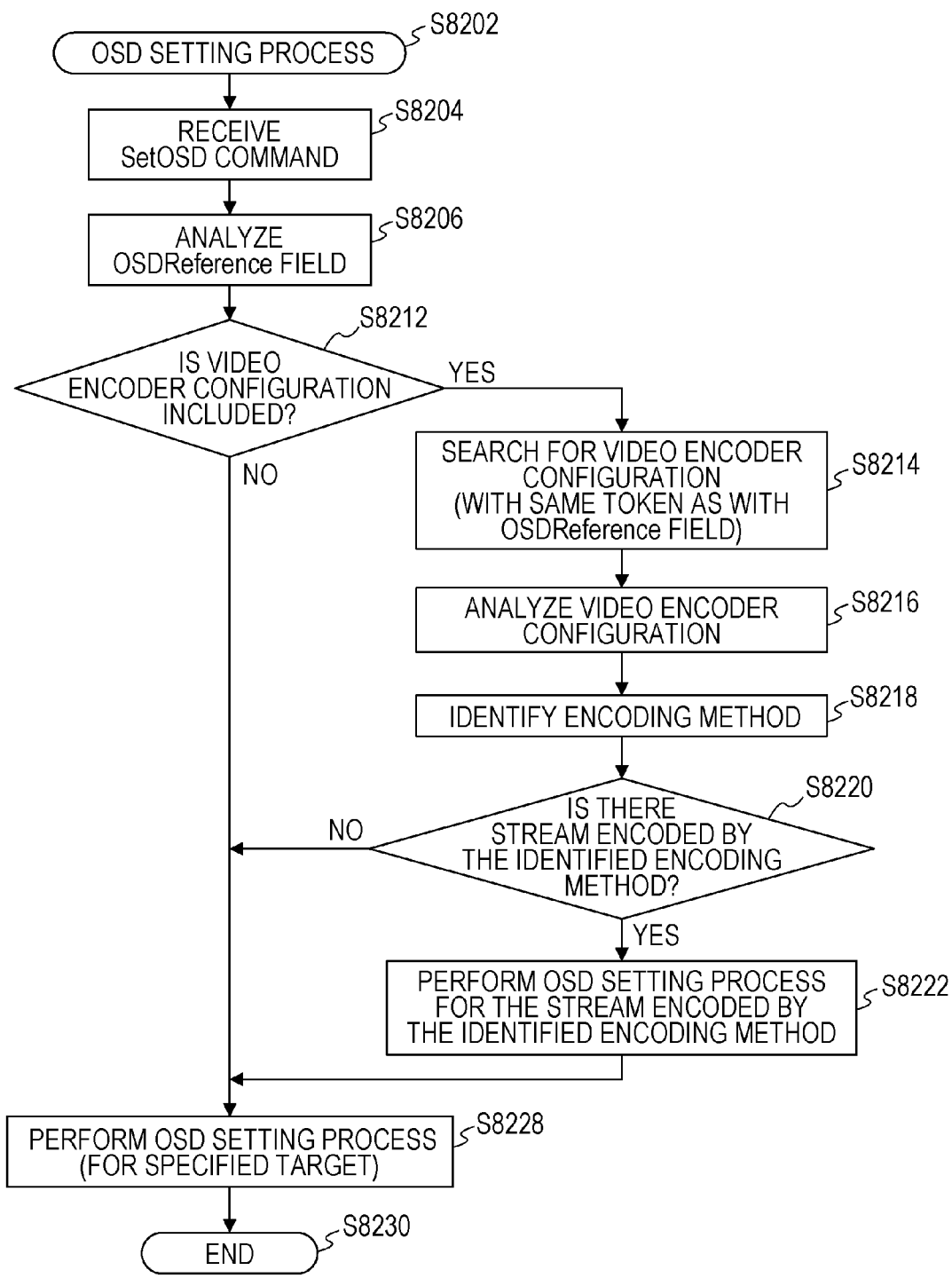
FIG. 11 is a diagram illustrating a process of setting an on-screen display (OSD) of a monitoring camera according to an embodiment.

Referring to FIG. 11, the OSD setting process on the monitoring camera according to the present embodiment is described below. FIG. 11 is a flow chart illustrating the OSD setting process on the monitoring camera according to the present embodiment.

In FIG. 11, in step S8202, the OSD setting process according to the present embodiment is started.

As described above, the client apparatus according to the present embodiment transmits the SetOSD command to the monitoring camera according to the present embodiment.

Next, in step S8204, the monitoring camera according to the present embodiment receives the SetOSD command.

Next, in step S8206, the OSDReference field in the SetOSD command is analyzed.

In step S8212, it is checked whether the OSDReference field includes a video encoder configuration token. In a case where the OSDReference field does not include a video encoder configuration token, then, in next step S8228, the monitoring camera performs the OSD setting process in a normal mode. The OSD setting process in step S8228 is performed based on the SetOSD command received in step S8204 described above.

In a case where it is determined in step S8212 that the OSDReference field includes a video encoder configuration token, the processing flow proceeds to step S8214. In step S8214, a video encoder configuration set in the monitoring camera is searched for. In the searching for the video encoder configuration, the same token as the video encoder configuration token included in the OSDReference field is applied.

Next, in step S8216, the retrieved video encoder configuration is analyzed.

Next, in step S8218, an encoding method is identified from the video encoder configuration.

Next, in step S8220, it is checked whether there is a stream with the same encoding method as the identified encoding method.

In a case where it is determined in step S8220 that there is no stream with the same encoding method as the identified encoding method, the processing flow proceeds to a next step S8228. In step S8228, as described above, the OSD setting process is performed in the normal mode.

In a case where it is determined in step S8220 that there is a stream with the same encoding method as the identified encoding method, the processing flow proceeds to step S8222 in which the OSD setting process is performed for all streams with the same encoding method as the identified encoding method. The OSD setting process is the same as that specified in the SetOSD command received in step S8204 except for the process associated with the video encoder configuration token included in the OSDReference field.

Thereafter, in next step S8228, the monitoring camera performs the OSD setting process in the normal mode. In next step S8230, the OSD setting process according to the present embodiment is ended. Next, referring to FIGS. 12A and 12B, the SetOSD command is described in further detail below.

FIG. 12A illustrates an example of a definition of the SetOSD command. The SetOSD command is a command used by the client apparatus according to the present embodiment to perform the OSD setting on the monitoring camera according to the present embodiment.

As illustrated in FIG. 12A, the SetOSD command includes an OSDfield of the OSDConfiguration type. An example of a definition of the data type of OSDConfiguration is illustrated in FIG. 7A.

As illustrated in FIG. 7A, data of the OSDConfiguration type includes an OSDReference field of the OSDReference. An example of a definition of the OSDReference type is illustrated in FIG. 7B.

As illustrated in FIG. 7B, the OSDReference type is a choice data type in which one of the followings is selected: VideoSourceConfigurationToken; VideoEncoderConfigurationToken; MediaProfileToken; StreamURI; and SnapshotURI.

In the present embodiment, the client apparatus specifies VideoEncoderConfigurationToken in the OSDReference field and issues a resultant SetOSD command. When the monitoring camera receives this SetOSD command, the monitoring camera searches for a video encoder configuration including the VideoEncoderConfigurationToken.

The monitoring camera then searches for an encoding method described in the video encoder configuration, and the monitoring camera performs the OSD setting specified in the SetOSD command for all streams using the same encoding method as the retrieved encoding method.

FIG. 12B illustrates a specific example of a configuration of the SetOSD command.

In the example in FIG. 12B, the video encoder configuration is specified as an OSD setting target. This is detected by a VideoEncoderConfigurationToken tag specified in the OSDReference field included in the OSDConfiguration field in the SetOSD command.

When the monitoring camera receives the SetOSD command such as that illustrated in FIG. 12B, the monitoring camera searches for a video encoder configuration with a token of H264_0. The monitoring camera according to the present embodiment then analyzes an encoding method described in the video encoder configuration. For example, in a case where the analysis indicates that the encoding method is H.264, the monitoring camera according to the present embodiment performs the OSD setting specified in FIG. 12B for all H.264 streams transmitted by the monitoring camera.

In the monitoring camera according to the present embodiment, as described above, in a case where the OSD setting is performed for a specified image encoding method, the same OSD setting is performed for all streams encoded in the specified encoding method.

Other Embodiments

The present invention may also be practiced by executing the following processing. That is, software (program) for implementing the functions disclosed in the embodiments is provided to a system or an apparatus via a network or a storage medium, and a computer (or a CPU or a MPU) in the system or the apparatus reads and executes the program.

According to the present embodiment, even in a case where the OSD function is configured such that superimposing is performed for a specified encoder, it is possible to reduce a difference in superimposing operation among encoders, and it is also possible to reduce a troublesome operation performed by a user.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(Trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-115685, filed May 31, 2013, and 2013-115687, filed May 31, 2013, which are hereby incorporated by reference herein in their entirety.

The invention claimed is:

1. An image pickup apparatus comprising:
   an image sensor configured to pick up an image;
   a reception interface configured to receive an acquisition request from a client apparatus, for acquiring information associated with a superimposing option of the image pickup apparatus, wherein the information is related to a parameter for superimposing a content on the image; and
   a transmission interface configured to transmit the information associated with the superimposing option of the image pickup apparatus in a case where the acquisition request for the information associated with the superimposing option available in the image pickup apparatus is received by the reception interface.

2. The image pickup apparatus according to claim 1, further comprising:
   one or more processors; and
   memory storing instructions that, when executed by the one or more processors, cause the image pickup apparatus to perform operations including:
   setting the parameter which is selected in an external apparatus and is sent to the reception interface, and
   superimposing a content on the picked up image based on the set parameter.

3. The image pickup apparatus according to claim 1, wherein the content includes a text or an image.

4. The image pickup apparatus according to claim 1, wherein the superimposing option includes at least an on screen display (OSD) position.

5. A method of controlling an image pickup apparatus configured to superimpose a content on an image, the method comprising:
   picking up an image;
   receiving an acquisition request from a client apparatus, for acquiring information associated with a superimposing option of the image pickup apparatus, wherein the information is related to a parameter for superimposing a content on the image; and
   transmitting the information associated with the superimposing option of the image pickup apparatus in a case where the acquisition request for the information associated with the superimposing option available in the image pickup apparatus is received by the image pickup apparatus.

6. The method according to claim 5, further comprising:
   setting the parameter which is selected in an external apparatus and is sent to the image pickup apparatus; and
   superimposing a content on the picked up image based on the parameter set in the setting.

7. The method according to claim 5, wherein the content includes a text or an image.

8. The method according to claim 5, wherein the superimposing option includes at least an on screen display (OSD) position.

9. A non-transitory computer-readable recording medium storing a program to cause a computer to perform a method of controlling an image pickup apparatus configured to superimpose a content on an image, the method comprising:
   picking up an image;
   receiving an acquisition request from a client apparatus, for acquiring information associated with a superimposing option of the image pickup apparatus, wherein the information is related to a parameter for superimposing a content on the image; and
   transmitting the information associated with the superimposing option of the image pickup apparatus in a case where the acquisition request for the information associated with the superimposing option available in the image pickup apparatus is received by the image pickup apparatus.

10. An image processing apparatus configured to display a picked-up image picked-up by an image pickup apparatus with a content superimposed, the image processing apparatus comprising:

a request interface configured to transmit an acquisition request to the image pickup apparatus;

a controller configured to control a display of a user interface for selection of a parameter for superimposing a content on the image based on information from the image pickup apparatus; and a sending interface configured to send a selected parameter to the image pickup apparatus.

11. The image processing apparatus according to claim 10, wherein the request interface transmits the acquisition request before displaying the user interface for selection of the parameter.

12. The image processing apparatus according to claim 10, wherein the content includes a text or an image.

13. The image processing apparatus according to claim 10, wherein the superimposing option includes at least an on screen display (OSD) position.

14. A method of controlling an image processing apparatus configured to display a picked-up image picked-up by an image pickup apparatus with a content superimposed, the method comprising:

transmitting an acquisition request to the image pickup apparatus;

controlling a display of a user interface for selection of a parameter for superimposing a content on the image based on information from the image pickup apparatus; and sending a selected parameter to the image pickup apparatus.

15. The method according to claim 14, wherein the acquisition request is transmitted before displaying the user interface for selection of the parameter.

16. The method according to claim 14, wherein the content includes a text or an image.

17. The method according to claim 14, wherein the superimposing option includes at least an on screen display (OSD) position.

18. A non-transitory computer-readable recording medium storing a program to cause a computer to perform a method of controlling an image processing apparatus configured to display a picked-up image picked-up by an image pickup apparatus with a content superimposed, the method comprising:

transmitting an acquisition request to the image pickup apparatus;

controlling a display of a user interface for selection of a parameter for superimposing a content on the image based on information from the image pickup apparatus; and sending a selected parameter to the image pickup apparatus.

* * * * *